(12) United States Patent
Kaneko et al.

(10) Patent No.: US 10,234,356 B2
(45) Date of Patent: Mar. 19, 2019

(54) EVAPORATION LEAKAGE CHECKING SYSTEM AND CHECKING METHOD OF EVAPORATION LEAKAGE USING THE SAME

(71) Applicant: DENSO CORPORATION, Kariya, Aichi-pref. (JP)

(72) Inventors: Makoto Kaneko, Kariya (JP); Yasuo Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 114 days.

(21) Appl. No.: 15/592,671

(22) Filed: May 11, 2017

(65) Prior Publication Data

US 2017/0328806 A1 Nov. 16, 2017

(30) Foreign Application Priority Data

May 13, 2016 (JP) .................................. 2016-96926

(51) Int. Cl.

| | |
|---|---|
| *F02M 25/08* | (2006.01) |
| *G01M 3/00* | (2006.01) |
| *G01M 3/26* | (2006.01) |
| *G01M 3/32* | (2006.01) |
| *G01M 9/00* | (2006.01) |

(Continued)

(52) U.S. Cl.
CPC ......... *G01M 3/26* (2013.01); *B60K 15/03504* (2013.01); *F02M 25/089* (2013.01); *F02M 25/0818* (2013.01); *F02M 25/0854* (2013.01); *B60K 2015/0321* (2013.01);
(Continued)

(58) Field of Classification Search
CPC .............. B60K 15/035; B60K 15/3504; B60K 2015/0321; B60K 2015/03256; B60K 2015/03328; B60K 2015/03514; F02M 25/08; F02M 25/0818; F02M 25/0854;
(Continued)

(56) References Cited

U.S. PATENT DOCUMENTS 6,993,957 B2 * 2/2006 Kano ................. F02M 25/0818
73/49.7
2004/0173013 A1 * 9/2004 Kobayashi ......... F02M 25/0818
73/114.41
(Continued)

FOREIGN PATENT DOCUMENTS

| JP | 2008002298 A | * | 1/2008 | .............. G01M 3/26 |
|---|---|---|---|---|
| JP | 2012122392 A | * | 6/2012 | .............. F02M 25/08 |

*Primary Examiner* — Nguyen Q. Ha
(74) *Attorney, Agent, or Firm* — Nixon & Vanderhye P.C.

(57) ABSTRACT

An evaporation leakage checking system includes a pump, a pump passage unit, a tank passage unit, a specified passage unit, an atmosphere passage unit, a flow-passage area changing unit, an atmosphere valve unit, a pressure sensing unit, and a control unit. The control unit includes a calculating unit that calculates a leakage threshold, based on a first pressure, a first area, an Nth pressure, an Nth area, and a reference area that is predetermined, and a leakage checking unit that activates the pump, closes the atmosphere passage unit by changing the flow-passage area of the atmosphere passage unit by using the atmosphere valve unit, and checks the existence of the evaporation leakage based on the leakage threshold and a checking pressure that is the pressure sensed by the pressure sensor in a case where a communication between the tank passage unit and the pump passage unit is allowed.

15 Claims, 15 Drawing Sheets

(51) Int. Cl.
*B60K 15/035* (2006.01)
*B60K 15/03* (2006.01)
*F02M 37/04* (2006.01)

(52) U.S. Cl.
CPC ............ *B60K 2015/03256* (2013.01); *B60K 2015/03328* (2013.01); *B60K 2015/03514* (2013.01); *F02M 37/045* (2013.01)

(58) Field of Classification Search
CPC ..... F02M 25/089; F02M 37/045; G01M 3/00; G01M 3/26; G01M 3/32; G01M 9/00
See application file for complete search history.

(56) References Cited

U.S. PATENT DOCUMENTS

| | | | |
|---|---|---|---|
| 2006/0016253 A1 | 1/2006 | Kobayashi et al. | |
| 2006/0042605 A1* | 3/2006 | Amano | F02M 25/0809 123/520 |
| 2011/0307195 A1* | 12/2011 | Koehler | F02M 25/0818 702/51 |
| 2012/0118046 A1 | 5/2012 | Kato | |
| 2012/0227580 A1* | 9/2012 | Dudar | F02M 25/0818 95/19 |
| 2013/0014563 A1* | 1/2013 | Itoh | F02M 25/0818 73/47 |
| 2014/0116401 A1* | 5/2014 | Horiba | F02M 25/0809 123/520 |
| 2014/0334946 A1* | 11/2014 | Larvall | F02M 21/0293 417/212 |
| 2014/0336873 A1* | 11/2014 | Dudar | F02M 25/0818 701/33.9 |
| 2015/0083087 A1* | 3/2015 | Pearce | F02M 25/0809 123/520 |
| 2016/0123280 A1* | 5/2016 | Makino | F02M 25/089 123/519 |
| 2016/0369722 A1* | 12/2016 | Wakamatsu | F02D 41/0032 |
| 2017/0058809 A1* | 3/2017 | Kim | F02M 25/0827 |

* cited by examiner

EVAPORATION LEAKAGE CHECKING SYSTEM AND CHECKING METHOD OF EVAPORATION LEAKAGE USING THE SAME

CROSS REFERENCE TO RELATED APPLICATION

This application is based on Japanese Patent Application No. 2016-96926 filed on May 13, 2016, the disclosure of which is incorporated herein by reference.

TECHNICAL FIELD

The present disclosure relates to an evaporation leakage checking system which checks a leakage of an evaporation that is a fuel evaporated from a fuel tank, and a checking method of an evaporation leakage using the evaporation leakage checking system.

BACKGROUND

Recently, a standard of an emission regulation of an evaporation that is a fuel leaked from an interior of a fuel tank to an exterior of the fuel tank becomes stricter and stricter. According to an Environmental Protection Agency (EPA) regulation and a California Air Resources Board (CARB) regulation, it is requested that a leakage of the evaporation from a slight opening of a fuel tank is sensed. According to JP2006-37752A, in an evaporation leakage checking system, a pressure of when a pump make an air flow through an orifice is sensed as a reference pressure, and then an existence of the evaporation leakage is checked based on the reference pressure and a pressure of when the pump increases or decreases a pressure in the fuel tank.

SUMMARY

However, in the future, the standard of the emission regulation of the evaporation may become further stricter. In addition, in countries and regions other than America, the above standard may be started.

According to JP2006-37752A, in the evaporation leakage checking system, since one reference pressure is sensed by using one orifice, it is necessary to change a diameter of the orifice to be applied to the standard that is changed. Further, when the standards of countries and regions are different from each other, it is necessary to change the diameter of the orifice to be applied to each of the standards. Thus, it is difficult to use the same component to be applied to all of the countries and the regions.

It is an object of the present disclosure to provide an evaporation leakage checking system which can be flexibly applied to a standard of an emission regulation of an evaporation, and a checking method of an evaporation leakage using the evaporation leakage checking system.

According to an aspect of the present disclosure, the evaporation leakage checking system includes a pump, a pump passage unit, a tank passage unit, a specified passage unit, an atmosphere passage unit, a flow-passage area changing unit, an atmosphere valve unit, a pressure sensing unit, and a control unit. The pump includes an inlet and an outlet.

The pump passage unit has a first end that is connected with the inlet or the outlet, and a second end.

The tank passage unit has a first end that is connected with a fuel tank storing a fuel, and a second end.

The specified passage unit has a first end that is connected with the second end of the pump passage unit, and a second end that is connected with the second end of the tank passage unit.

The atmosphere passage unit has a first end that is connected with the second end of the tank passage unit or the second end of the specified passage unit, and a second end that is exposed to the atmosphere.

The flow-passage area changing unit changes a flow-passage area of the specified passage unit to a plurality of areas including a first area and an Nth area, N being a value greater than one.

The atmosphere valve unit changes a flow-passage area of the atmosphere passage unit.

The pressure sensing unit senses a pressure in the pump passage unit.

The control unit controls operations of the pump, the flow-passage area changing unit, and the atmosphere valve unit.

The control unit includes a calculating unit and a leakage checking unit.

The calculating unit calculates a leakage threshold that is a threshold used to check an existence of an evaporation leakage that is a leakage of an evaporation that is an evaporated fuel, based on a first pressure that is relative to a pressure sensed by the pressure sensor in a case where the pump is activated and the flow-passage area changing unit changes the flow-passage area of the specified passage unit to the first area, the first area, an Nth pressure that is relative to the pressure sensed by the pressure sensor in a case where the pump is activated and the flow-passage area changing unit changes the flow-passage area of the specified passage unit to the Nth area, the Nth area, and a reference area that is predetermined.

The leakage checking unit activates the pump, closes the atmosphere passage unit by changing the flow-passage area of the atmosphere passage unit by using the atmosphere valve unit, and checks the existence of the evaporation leakage based on the leakage threshold and a checking pressure that is the pressure sensed by the pressure sensor in a case where a communication between the tank passage unit and the pump passage unit is allowed.

The calculating unit can estimate the PQ characteristic of the pump, based on the first pressure, the first area, the Nth pressure, and the Nth area. The calculating unit can calculate the leakage threshold based on the PQ characteristic of the pump that is estimated and the reference area that is predetermined. According to the present disclosure, since the air flows into the specified passage unit having at least two flow-passage areas that are the first area and the Nth area, the PQ characteristic of the pump is estimated and the leakage threshold is calculated. When the reference area is set to an arbitrary value, the leakage threshold corresponding to the reference area can be calculated. Thus, when a standard of an emission regulation of the evaporation is changed or when standards of the emission regulation of the evaporation are different in plural countries and regions, the leakage threshold can be calculated according to a reference in a case where a value of the reference area is set according to the reference, without changing a diameter of an orifice as a conventional technology. Thus, the evaporation leakage checking system can be flexibly applied to the standard of the emission regulation of the evaporation.

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

Figure 1:
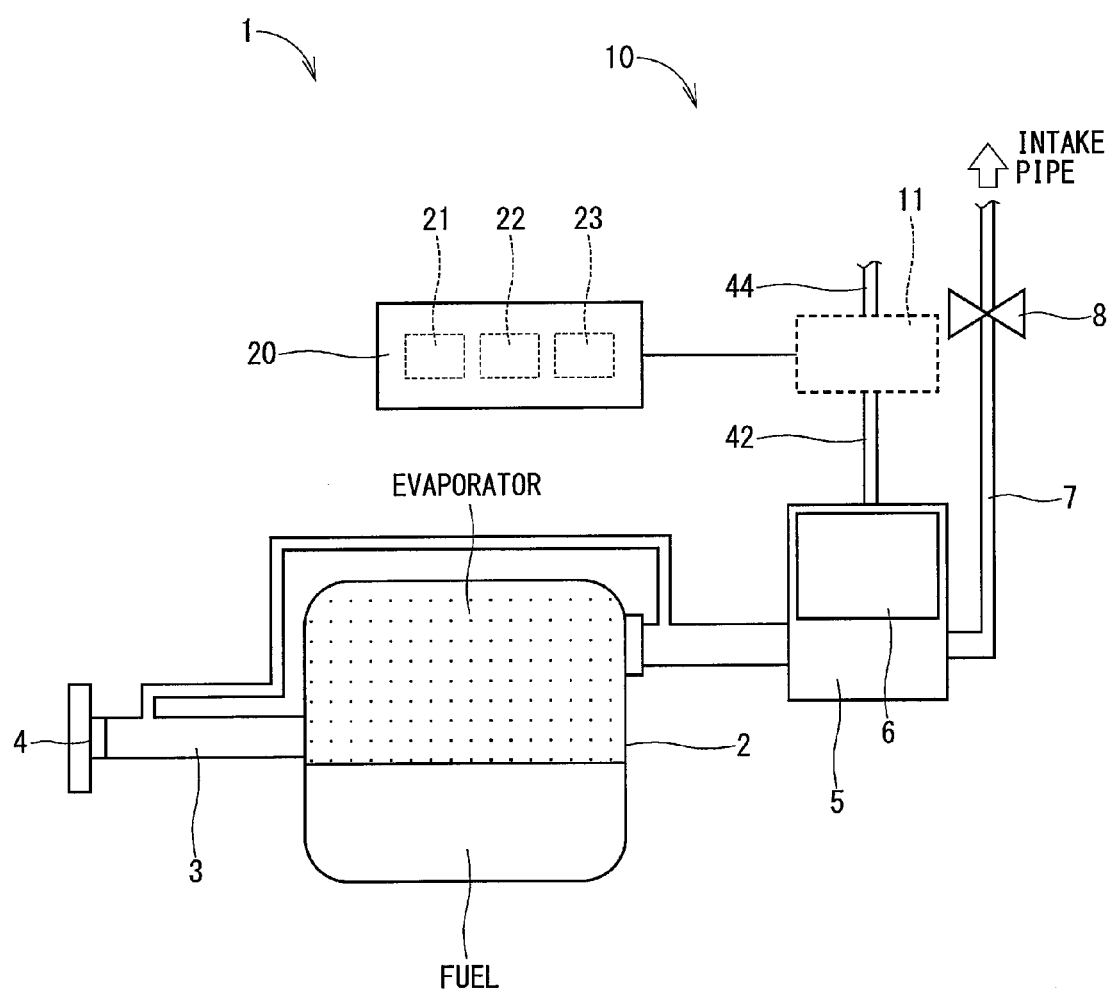
FIG. 1 is schematic diagram showing an evaporation system including an evaporation leakage checking system, according to a first embodiment of the present disclosure.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Hereafter, referring to drawings, an evaporation leakage checking system according to embodiments of the present disclosure will be described. The substantially same part or components as those in the embodiments are indicated with the same reference numerals and the same descriptions may be omitted.

First Embodiment

An evaporation system 1 including the evaporation leakage checking system 10 according to a first embodiment of the present disclosure is shown in FIG. 1.

The evaporation system 1 includes a fuel tank 2 and the evaporation leakage checking system 10. The evaporation system 1 is applied to a vehicle that is not shown and travels by using a driving power generated by an internal combustion engine. The fuel tank 2 stores a fuel such as a gasoline which is supplied to the internal combustion engine. In the fuel tank 2, an evaporation that is an evaporated fuel is generated. In this case, the evaporated fuel is the fuel stored in the fuel tank 2 and then evaporated. According to the present embodiment, the evaporation is also referred to as an evaporator.

The fuel tank 2 is connected with a supply passage unit 3. A supply inlet 4 is arranged at a position where the supply passage unit 3 is interposed between the fuel tank 2 and the supply inlet 4. The fuel is supplied to the fuel tank 2 through the supply inlet 4 and the supply passage unit 3.

The evaporation leakage checking system 10 includes a tank passage unit 42, an atmosphere passage unit 44, a checking module 11, and an electronic control unit (ECU) 20 as a control unit.

The tank passage unit 42 has a first end that is connected with the fuel tank 2 through a canister 5, and a second end that is connected with the checking module 11. In other words, the canister 5 arranged at a position in the tank passage unit 42 between the fuel tank 2 and the checking module 11. The atmosphere passage unit 44 has a first end that is connected with the checking module 11, and a second end that is exposed to the atmosphere.

The canister 5 includes an adsorber 6. According to the present embodiment, the adsorber 6 that is an activated carbon adsorbs the evaporation generated at the fuel tank 2. The canister 5 is connected with a purging passage unit 7 that communicates with an intake pipe that is not shown. When the evaporation generated at the fuel tank 2 passes through the canister 5, the evaporation is adsorbed by the adsorber 6. Thus, a concentration of the evaporation in an air flowing out from the canister 5 becomes less than or equal to a predetermined concentration. The intake pipe that is connected with the internal combustion engine includes a throttle valve that adjusts a flow rate of an intake air that flows into the intake pipe. The purging passage unit 7 includes a purging valve 8. When the intake air flows into the intake pipe and when the purging valve 8 is opened, a negative pressure is generated in the purging passage unit 7. In this case, the evaporation adsorbed in the adsorber 6 is purged to the intake pipe.

Figure 2:
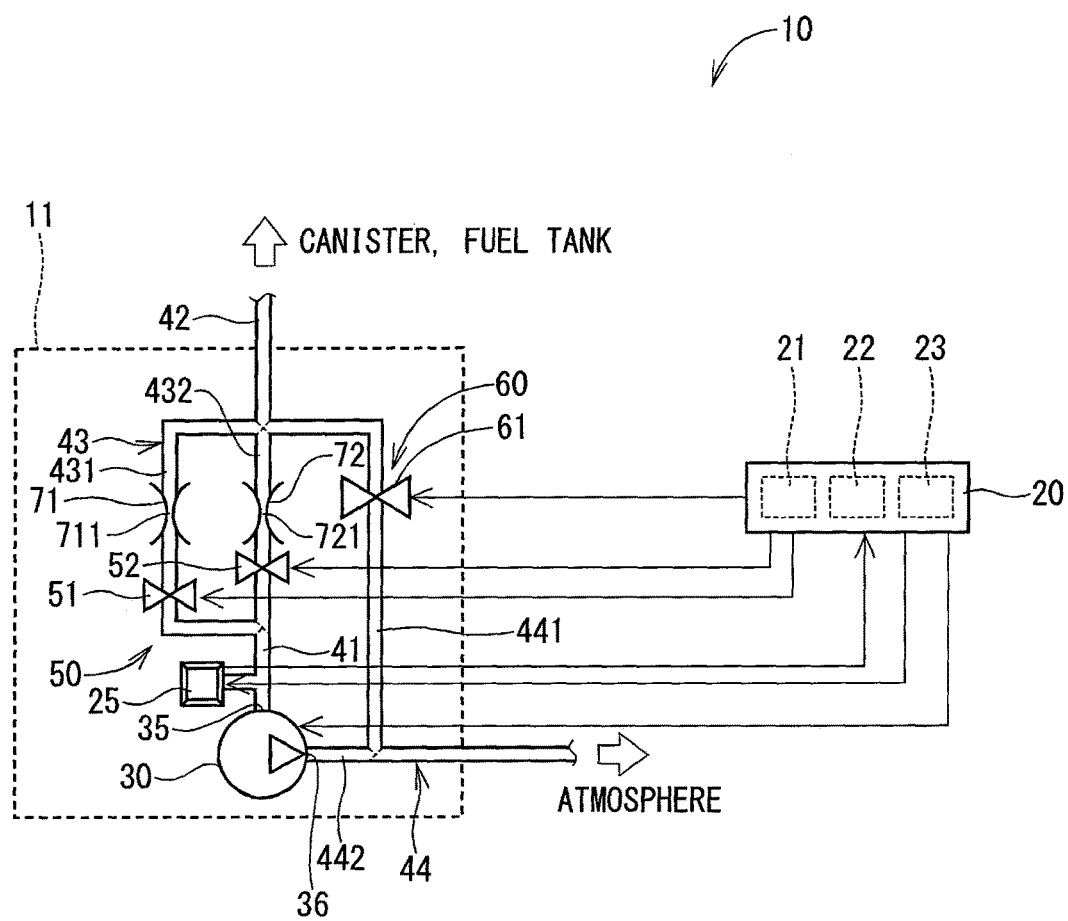
FIG. 2 is a schematic diagram showing the evaporation leakage checking system, according to the first embodiment.

As shown in FIG. 2, the checking module 11 includes a pump 30, a pump passage unit 41, a specified passage unit 43, a flow-passage area changing unit 50, an atmosphere valve unit 60, and a pressure sensor 25 as a pressure sensing unit.

Figure 3A:
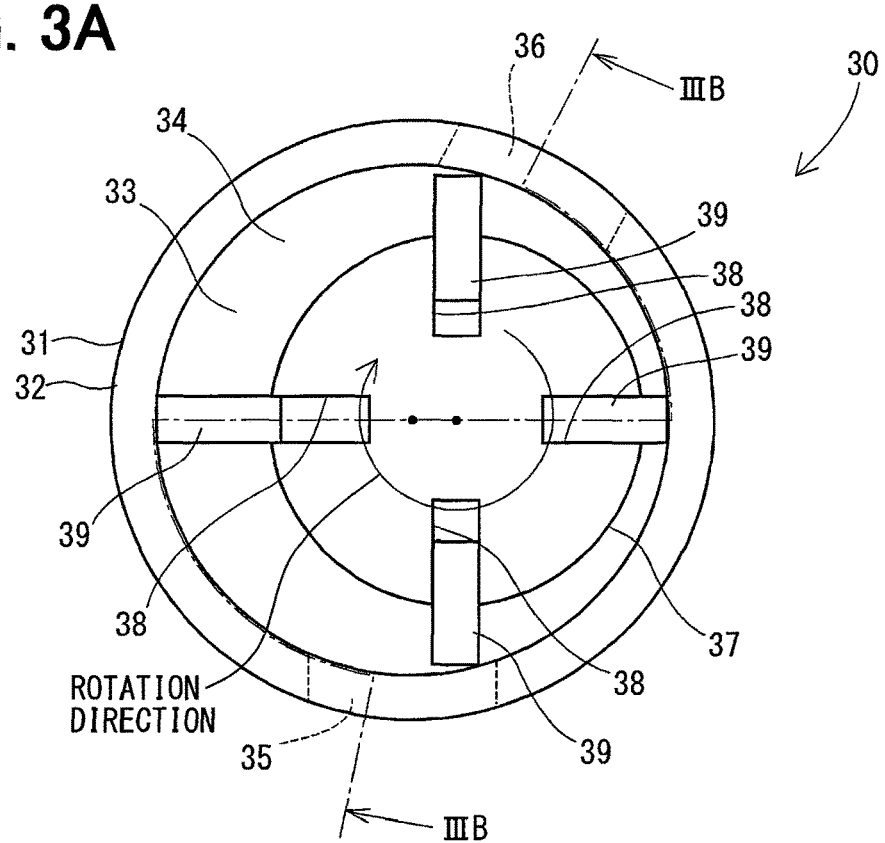
FIG. 3A is a cross-sectional view showing the evaporation leakage checking system, according to the first embodiment.
Figure 3B:
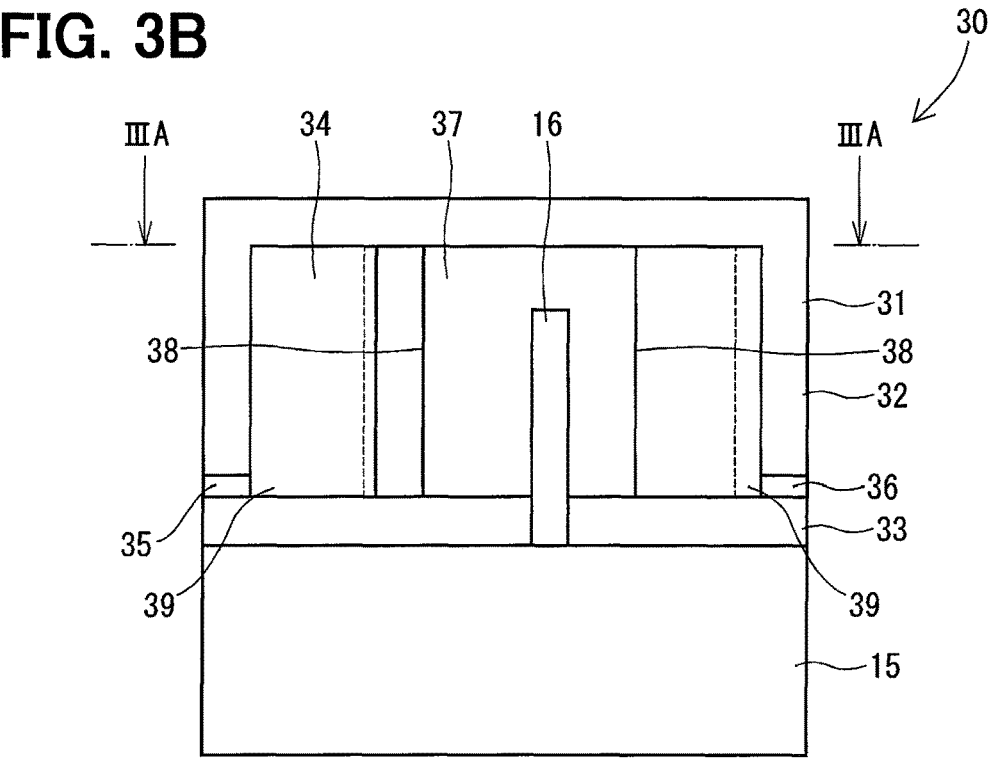
FIG. 3B is a cross-sectional view taken by a line IIIB-IIIB of FIG. 3A.

As shown in FIG. 3, the pump 30 that is a vane pump includes a casing 31, a rotor 37, a vane 39, and a motor 15.

The casing 31 includes a bottomed cylinder unit 32 and a cover unit 33. The bottomed cylinder unit 32 is a bottomed cylindrical shape. The cover unit 33 covers an opening of the bottomed cylinder unit 32. The bottomed cylinder unit 32 and the cover unit 33 define a pump chamber 34 that is a substantially cylindrical hollow between the bottomed cylinder unit 32 and the cover unit 33. The bottomed cylinder unit 32 has an end portion facing the cover unit 33, and the end portion includes an inlet 35 and an outlet 36 which communicate with the pump chamber 34.

The rotor 37 is a substantially cylindrical shape and is received in the pump chamber 34. The rotor 37 is arranged at a position in the pump chamber 34 where an axis of the rotor 37 is shifted from an axis of the pump chamber 34. The rotor 37 has a height that is a magnitude of the rotor 37 in a direction parallel to the axis of the rotor 37, and the height of the rotor 37 is slightly less than a distance from a bottom portion of the bottomed cylinder unit 32 to the cover unit 33. Thus, a clearance is located between the rotor 37 and the casing 31. A groove portion 38 is arranged on an outer periphery of the rotor 37. The groove portion 38 extends in an axial direction of the rotor 37. According to the present embodiment, four groove portions 38 are arranged on the rotor 37.

The vane 39 is a plate that is substantially rectangle, and is received in the groove portion 38. The vane 39 has a height that is substantially equal to the height of the rotor 37. According to the present embodiment, four vanes 39 are received in the groove portions 38, respectively. The vanes 39 slide relative to the groove portions 38 in the pump chamber 34 in a radial direction of the rotor 37. In other words, the vanes 39 can reciprocate relative to the groove portions 38 in the pump chamber 34 in the radial direction of the rotor 37. Alternatively, the vanes 39 are provided to reciprocate in the groove portions 38 in the radial direction of the rotor 37.

The motor 15 includes a shaft 16. When the motor 15 is energized, the motor 15 rotates, and a torque is outputted from the shaft 16. The shaft 16 is connected with the axis of the rotor 37. Thus, the rotor 37 is rotatably driven by a rotation of the motor 15. When the rotor 37 rotates, the vanes 39 are separated from the rotor 37 in the radial direction of the rotor 37 by a centrifugal force, and then are in contact with an inner wall of the bottomed cylinder unit 32. Since the rotor 37 is arranged at an eccentric position relative to the pump chamber 34, the vanes 39 slide relative to the inner wall of the bottomed cylinder unit 32 and reciprocate in the radial direction of the rotor 37 in a case where the rotor 37 rotates. According to the present embodiment, the inlet 35 is arranged at a position in the bottomed cylinder unit 32 where a space in the pump chamber 34 between two vanes 39 increases when the rotor 37 rotates. The outlet 36 is arranged at a position in the bottomed cylinder unit 32 where a space in the pump chamber 34 between two vanes 39 decreases when the rotor 37 rotates. In other words, the inlet 35 is arranged at a position in the bottomed cylinder unit 32 where a fluid in the pump chamber 34 between two vanes 39 is expanded when the rotor 37 rotates, and the outlet 36 is arranged at a position in the bottomed cylinder unit 32 where a fluid in the pump chamber 34 between two vanes 39 is compressed when the rotor 37 rotates.

As the above configuration, when the rotor 37 rotates, a fluid outside of the pump 30 is suctioned into the pump chamber 34 through the inlet 35. The fluid suctioned into the pump chamber 34 is compressed and moved by a rotation of the vanes 39, and is discharged from the outlet 36 to an exterior of the pump 30.

As shown in FIG. 2, the pump passage unit 41 has a first end that is connected with the inlet 35 of the pump 30.

The specified passage unit 43 that is made of a resin includes a first passage 431 and a second passage 432. The first passage 431 has a first end that is connected with a second end of the pump passage unit 41, and a second end that is connected with the second end of the tank passage unit 42. In other words, the second end of the first passage 431 is connected with the second end of the tank passage unit 42 that is opposite to the first end of the tank passage unit 42 where the fuel tank 2 is connected with. The second passage 432 has a first end that is connected with the second end of the pump passage unit 41, and a second end that is connected with the second end of the tank passage unit 42. In other words, the second end of the second passage 432 is connected with the second end of the tank passage unit 42 that is opposite to the first end of the tank passage unit 42 where the fuel tank 2 is connected with. According to the present embodiment, the specified passage unit 43 has a first end including the first end of the first passage 431 and the first end of the second passage 432, and a second end including the second end of the first passage 431 and the second end of the second passage 432.

The atmosphere passage unit 44 has the first end that is divided into two passages that are a first dividing passage 441 and a second dividing passage 442. The first dividing passage 441 has an end portion that is opposite to a connection position of the first dividing passage 441 and the second dividing passage 442, and the end portion is connected with a position between the tank passage unit 42 and the specified passage unit 43. In other words, the first end of the atmosphere passage unit 44 is connected with the second end of the tank passage unit 42 and the second end of the specified passage unit 43. The second dividing passage 442 has an end portion that is opposite to the connection position, and the end portion is connected with the outlet 36 of the pump 30. The second end of the atmosphere passage unit 44 that is opposite to the first dividing passage 441 and the second dividing passage 442 is exposed to the atmosphere. The atmosphere passage unit 44 includes a filter that is not shown.

As shown in FIG. 2, dashed lines indicate boundaries between the pump passage unit 41, the tank passage unit 42, the specified passage unit 43, and the atmosphere passage unit 44.

According to the present embodiment, the inlet 35 of the pump 30 is connected to the first end of the pump passage unit 41. Thus, when the pump 30 is activated, a pressure in the pump passage unit 41, the specified passage unit 43, the tank passage unit 42, and the fuel tank 2 can be decreased.

The flow-passage area changing unit 50 includes a first closing valve 51 and a second closing valve 52.

The first closing valve 51 is arranged in the first passage 431, and opens or closes the first passage 431. The first closing valve 51 normally closes the first passage 431. In other words, when the first closing valve 51 is deenergized, the first closing valve 51 closes the first passage 431. When the first closing valve 51 is energized, the first closing valve 51 opens the first passage 431. The first closing valve 51 is a normally-closing valve.

The second closing valve 52 is arranged in the second passage 432, and opens or closes the second passage 432. The second closing valve 52 normally closes the second passage 432. In other words, when the second closing valve 52 is deenergized, the second closing valve 52 closes the second passage 432. When the second closing valve 52 is energized, the second closing valve 52 opens the second passage 432. Similarly, the second closing valve 52 is also a normally-closing valve.

According to the present embodiment, the checking module 11 further includes a first orifice member 71 and a second orifice member 72 which are used as an orifice member.

The first orifice member 71 and the second orifice member 72 are made of a metal such as a stainless.

The first orifice member 71 is arranged in the first passage 431. The first orifice member 71 includes a first opening 711 that is an opening having an area A1 that is predetermined. Thus, a flow-passage area of the first passage 431 of the specified passage unit 43 is equivalent to the area A1 of the first opening 711.

The second orifice member 72 is arranged in the second passage 432. The second orifice member 72 includes a second opening 721 that is an opening having an area A2 that is predetermined. Thus, a flow-passage area of the second passage 432 of the specified passage unit 43 is equivalent to the area A2 of the second opening 721.

As the above description, the specified passage unit 43 is made of a resin, and the first orifice member 71 and the second orifice member 72 are made of a stainless. Thus, the first orifice member 71 and the second orifice member 72 have characteristics that linear expansion coefficients are less than that of a member constituting the specified passage unit 43, variations of dimension generated due to a water absorbing are less than that of the member constituting the specified passage unit 43, variations of dimension generated due to the fuel that is exposed are less than that of the member constituting the specified passage unit 43, and variations of opening areas generated due to a magnesium chloride solution, a calcium chloride solution, or a natrium chloride solution that is exposed are less than that of the member constituting the specified passage unit 43.

When the first closing valve 51 and the second closing valve 52 of the flow-passage area changing unit 50 close the first passage 431 and the second passage 432, respectively, a flow-passage area of the specified passage unit 43 is zero. When the first closing valve 51 opens the first passage 431 and when the second closing valve 52 closes the second passage 432, the flow-passage area of the specified passage unit 43 is the area A1 of the first opening 711 of the first orifice member 71. When the first closing valve 51 closes the first passage 431 and when the second closing valve 52 opens the second passage 432, the flow-passage area of the specified passage unit 43 is the area A2 of the second opening 721 of the second orifice member 72. When the first closing valve 51 opens the first passage 431 and when the second closing valve 52 opens the second passage 432, the flow-passage area of the specified passage unit 43 is an area A3 that is a sum of the area A1 of the first opening 711 of the first orifice member 71 and the area A2 of the second opening 721 of the second orifice member 72.

As the above description, the flow-passage area changing unit 50 can change the flow-passage area of the specified passage unit 43 to three areas that are the area A1, the area A2, and the area A3, according to valve opening-closing states of the first closing valve 51 and the second closing valve 52.

The atmosphere valve unit 60 includes an atmosphere closing valve 61.

The atmosphere closing valve 61 is arranged in the first dividing passage 441 of the atmosphere passage unit 44, and opens or closes the first dividing passage 441. The atmosphere closing valve 61 normally opens the first dividing passage 441. In other words, when the atmosphere closing valve 61 is deenergized, the atmosphere closing valve 61 opens the first dividing passage 441. When the atmosphere closing valve 61 is energized, the atmosphere closing valve 61 closes the first dividing passage 441. The atmosphere closing valve 61 is a normally-opening valve.

When the atmosphere closing valve 61 of the atmosphere valve unit 60 opens the first dividing passage 441, a flow-passage area of the atmosphere passage unit 44 is a flow-passage area of the first dividing passage 441. When the atmosphere closing valve 61 of the atmosphere valve unit 60 closes the first dividing passage 441, the flow-passage area of the atmosphere passage unit 44 is zero. According to the present embodiment, the atmosphere closing valve 61 of the atmosphere valve unit 60 can change the flow-passage area of the atmosphere passage unit 44 to the flow-passage area of the first dividing passage 441 or zero.

The pressure sensor 25 is arranged in the pump passage unit 41. The pressure sensor 25 senses the pressure in the pump passage unit 41, and outputs a signal relative to the pressure that is sensed to the ECU 20.

The pressure sensor 25 can sense an atmospheric pressure that is a pressure of the atmosphere by sensing the pressure in the pump passage unit 41 in a start of the internal combustion engine.

The pressure sensor 25 can sense the pressure in the pump passage unit 41 after a predetermined time interval has elapsed since the start of the internal combustion engine, according to valve opening-closing states of the first closing valve 51, the second closing valve 52, and the atmosphere valve unit 60.

The ECU 20 is a computer including a CPU, a ROM, a RAM, and an input-output interface (I/O interface). The ECU 20 executes a calculation using a program stored in the ROM based on signals transmitted from sensors arranged on components of the vehicle, and controls operations of the internal combustion engine and various devices which are mounted to the vehicle. The ECU 20 executes the program stored in a storage media that is substantive and non-transitive. When the ECU 20 executes the program, the ECU 20 executes a method corresponding to the program.

The ECU 20 can control an operation of the pump 30 by controlling an energization of the motor 15 of the pump 30. The ECU 20 can control an operation of the flow-passage area changing unit 50 by controlling energization of the first closing valve 51 and the second closing valve 52 of the flow-passage area changing unit 50. The ECU 20 can control an operation of the atmosphere valve unit 60 by controlling an energization of the atmosphere closing valve 61 of the atmosphere valve unit 60.

The ECU 20 can sense the pressure in the pump passage unit 41 based on the signal transmitted from the pressure sensor 25.

The ECU 20 includes a calculating unit 21, a leakage checking unit 22, and a malfunction determining unit 23 that are functional units functioning by executing of the program that is a software.

The calculating unit 21 calculates a leakage threshold Pref that is a threshold used to check whether the evaporation leakage occurs, based on a first pressure P1 that is relative to the pressure sensed by the pressure sensor 25 in a case where the pump 30 is activated and the flow-passage area changing unit 50 changes the flow-passage area of the specified passage unit 43 to the area A1, a first area that is the area A1, a second pressure P3 that is relative to the pressure sensed by the pressure sensor 25 in a case where the pump 30 is activated and the flow-passage area changing unit 50 changes the flow-passage area of the specified passage unit 43 to the area A3, a second area that is the area A3, and a reference area Aref that is a predetermined area.

Specifically, when the pump 30 is deenergized or turned off, the calculating unit 21 stores the pressure sensed by the pressure sensor 25 as the atmospheric pressure Pa.

When the pump 30 is activated or turned on and when the flow-passage area of the specified passage unit 43 is the area A1 in a case where the first closing valve 51 is turned on to open and the second closing valve 52 is turned off to close, the calculating unit 21 calculates a differential pressure between the pressure P sensed by the pressure sensor 25 and the atmospheric pressure Pa as the first pressure P1. In this case, P1=P−Pa.

When the pump 30 is activated or turned on and when the flow-passage area of the specified passage unit 43 is the area A3 in a case where the first closing valve 51 and the second closing valve 52 are turned on to open, the calculating unit 21 calculates the differential pressure between the pressure P sensed by the pressure sensor 25 and the atmospheric pressure Pa as second pressure P3. In this case, P3=P−Pa.

When constants C1 and C2 are established, a PQ characteristic indicating a relationship between the differential pressure that is a differential pressure of the pump 30 and a pumping quantity can be approximated by a primary curve as a following formula (i). In this case, the differential pressure of the pump 30 is a differential pressure between a pressure at the inlet 35 and a pressure at the outlet 36.

$$Q = C1 \times |P - Pa| + C2 \qquad (i)$$

When an air density pa is established, a pumping quantity of an opening having an area corresponding to the area A1 is indicated by a following formula (ii).

$$Q = A \times \sqrt{\frac{|P - Pa|}{\rho a}} \qquad (ii)$$

According to the present embodiment, a pressure generating source at the pump passage unit 41 is only the pump 30. Thus, Q in formula (i) is equal to Q in formula (ii), and a following formula (iii) can be obtained.

$$C1 \times |P - Pa| + C2 = A \times \sqrt{\frac{|P - Pa|}{\rho a}} \qquad (iii)$$

When a temperature variation and a pressure variation of a region including an interior of the pump 30, an interior of the pump passage unit 41, and peripheral regions of the pump 30 and the pump passage unit 41 is small, pa is used as a constant. In this case, when the temperature variation is from 18 degrees Celsius to 22 degrees Celsius and when the pressure variation is from 97.8 kPa to 104.8 kPa, pa is from 1.155 to 1.255. Thus, when two or more groups of A and P are obtained, C1 and C2 can be calculated, and the PQ characteristic of the pump 30 can be surely determined.

However, since a flow-passage area of an actual product varies due to a dimension variation in manufacturing and a dimension variation generated due to a temperature variation and a humidity variation, it is a vast cost and requires a vast man-hours that a proper value of the flow-passage area for each product is previously set to accurately obtain the flow-passage area.

According to the present embodiment, a calculation of a checking operation of the evaporation leakage is executed using a range of the value of the flow-passage area by considering the variation of each product, without previously setting the proper value of the flow-passage area for each product.

Figure 4:
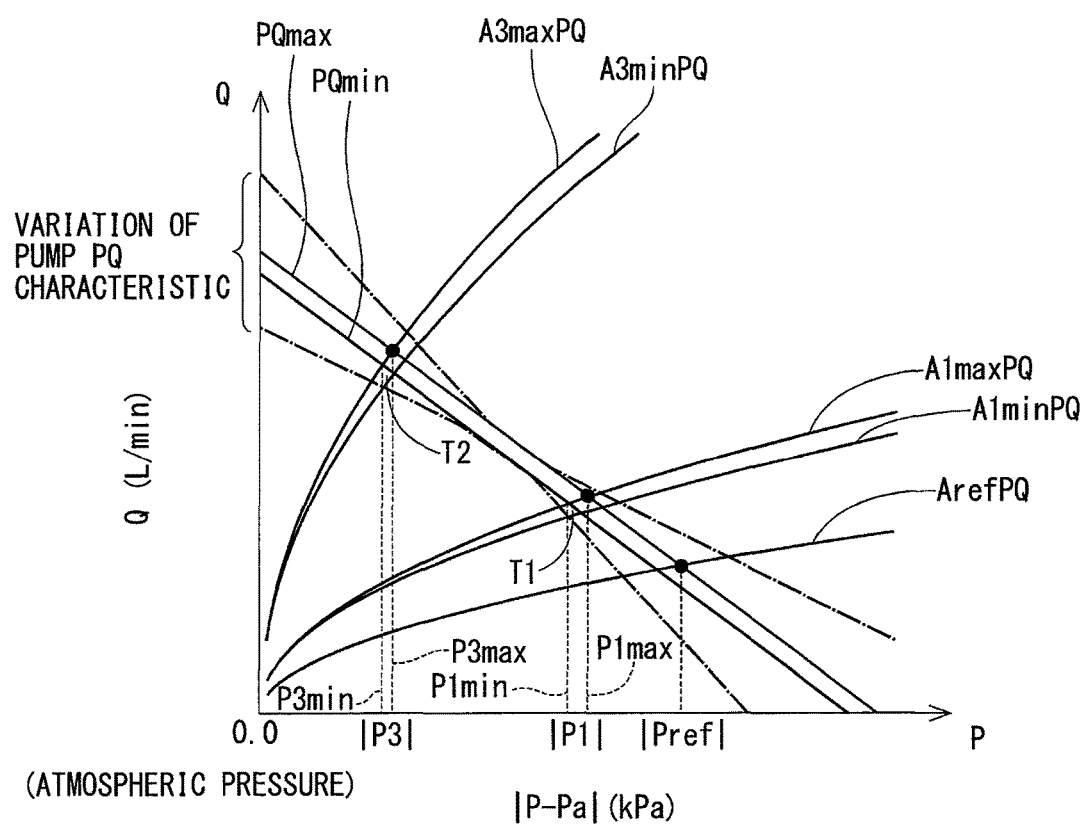
FIG. 4 is a graph showing a PQ characteristic of a pump of the evaporation leakage checking system, according to the first embodiment.

As shown in FIG. 4, a first PQ upper limit A1maxPQ indicates the PQ characteristic of when the flow-passage area is an upper limit of the range relative to the area A1, a first PQ lower limit A1minPQ indicates the PQ characteristic of when the flow-passage area is a lower limit of the range relative to the area A1, a second PQ upper limit A3maxPQ indicates the PQ characteristic of when the flow-passage area is an upper limit of the range relative to the area A3, and a second PQ lower limit A3minPQ indicates the PQ characteristic of when the flow-passage area is a lower limit of the range relative to the area A3. The first PQ upper limit A1maxPQ and the first PQ lower limit A1minPQ are values obtained by substituting a maximum value of the first area A1 and a minimum value of the first area A1 for A in formula (ii), respectively. In this case, the maximum value of the first area A1 and the minimum value of the first area A1, which are estimated based on a dimension variation of the first orifice member 71 in manufacturing and a dimension variation of the first orifice member 71 generated due to a temperature variation and a humidity variation, are the upper limit of the range relative to the area A1 and the lower limit of the range relative to the area A1, respectively. The second PQ upper limit A3maxPQ and the second PQ lower limit A3minPQ are values obtained by substituting a maximum value of the second area A3 and a minimum value of the second area A3 for A in formula (ii), respectively. In this case, the maximum value of the second area A3 and the minimum value of the second area A3, which are estimated based on dimension variations of the first orifice member 71 and the second orifice member 72 in manufacturing and dimension variations of the first orifice member 71 and the second orifice member 72 generated due to a temperature variation and a humidity variation, are the upper limit of the range relative to the area A3 and the lower limit of the range relative to the area A3, respectively. The PQ characteristic of when the flow-passage area is the area A1 varies between the first PQ upper limit A1maxPQ and the first PQ lower limit A1minPQ, and the PQ characteristic of when the flow-passage area is the area A3 varies between the second PQ upper limit A3maxPQ and the second PQ lower limit A3minPQ.

As shown in FIG. 4, a first pressure upper limit P1max indicates an upper limit of the first pressure P1, a first pressure lower limit P1min indicates a lower limit of the first pressure P1, a second pressure upper limit P3max indicates an upper limit of the second pressure P3, and a second pressure lower limit P3min indicates a lower limit of the second pressure P3. The first pressure upper limit P1max and the first pressure lower limit P1min are a maximum value and a minimum value of an absolute value of the first pressure P1 that is estimated based on a sensing error that is a variation of a sensing value of the pressure sensor 25 generated when the same pressure is repeatedly sensed, respectively. The second pressure upper limit P3max and the second pressure lower limit P3min are a maximum value and a minimum value of an absolute value of the second pressure P3 that is estimated based on the sensing error of the pressure sensor 25.

According to the present embodiment, the calculating unit 21 estimates an upper limit PQmax of the PQ characteristic of the pump 30, based on the first PQ upper limit A1maxPQ, the first pressure upper limit P1max, the second PQ upper limit A3maxPQ, and the second pressure upper limit P3max. The upper limit PQmax includes an intersection point between the first PQ upper limit A1maxPQ and the first pressure upper limit P1max, and an intersection point between the second PQ upper limit A3maxPQ and the second pressure upper limit P3max.

According to a California Air Resources Board (CARB) regulation and an Environmental Protection Agency (EPA) regulation, it is requested that a sensing accuracy of an evaporation leakage from an evaporation system including a fuel tank meets a condition that the evaporation leakage having a dimension of φ0.5 mm is sensed. Thus, according to the present embodiment, the reference area Aref is set to an area of an opening having a dimension of φ0.5 mm. In this case, the reference area Aref is about 0.196 mm2.

As shown in FIG. 4, a reference PQ characteristic ArefPQ indicates the PQ characteristic of when the flow-passage area is the reference area Aref. The reference PQ characteristic ArefPQ is a value obtained by substituting the reference area Aref for A in formula (ii).

The calculating unit 21 calculates the leakage threshold Pref based on an intersection point between the upper limit PQmax of the pump 30 that is estimated and the reference PQ characteristic ArefPQ.

The leakage checking unit 22 activates the pump 30, closes the atmosphere passage unit 44 by changing the flow-passage area of the atmosphere passage unit 44 by using the atmosphere valve unit 60, and checks whether the evaporation leakage occurs based on the leakage threshold Pref and a checking pressure Pc that is relative to the pressure sensed by the pressure sensor 25 in a case where a communication between the tank passage unit 42 and the pump passage unit 41 is allowed.

Specifically, the leakage checking unit 22 activates or turns on the pump 30, and closes the first dividing passage 441 by turning on the atmosphere closing valve 61 of the atmosphere valve unit 60. Further, when the first closing valve 51 and the second closing valve 52 of the flow-passage area changing unit 50 are turned on and when the first passage 431 and the second passage 432 are opened and when the communication between the tank passage unit 42 and the pump passage unit 41 is allowed, the leakage checking unit 22 uses a differential pressure between the atmospheric pressure Pa and the pressure P sensed by the pressure sensor 25 as the checking pressure Pc.

When an absolute value of the checking pressure Pc is less than an absolute value of the leakage threshold Pref, the leakage checking unit 22 determines that the evaporation leakage occurs. In this case, the ECU 20 notifies a driver that the evaporation leakage occurs by lighting an indication lamp of a display device that is arranged in front of a driver's seat in the vehicle.

The PQ characteristic of the pump 30 varies in a range between two dashed-dotted lines shown in FIG. 4. The PQ characteristic of the pump 30 that is limited by a relationship between the first area A1, the first pressure P1, the second area A3, and the second pressure P3 varies in a range from the upper limit PQmax to a lower limit PQmin. In this case, the lower limit PQmin includes an intersection point between the first PQ upper limit A1maxPQ and the first pressure lower limit P1min, and an intersection point between the second PQ upper limit A3maxPQ and the second pressure lower limit P3min.

When the first pressure P1 or the second pressure P3 becomes out of a range obtained based on the first area A1 and the second area A3, the malfunction determining unit 23 determines that a malfunction occurs in the evaporation leakage checking system 10. In this case, the range is also obtained based on a variation of a characteristic of the pump 30. As shown in FIG. 4, the range includes a first range T1 surrounded by the first PQ upper limit A1maxPQ, the first PQ lower limit A1minPQ, the first pressure upper limit P1max, and the first pressure lower limit P1min, and a second range T2 surrounded by the second PQ upper limit A3maxPQ, the second PQ lower limit A3minPQ, the second pressure upper limit P3max, and the second pressure lower limit P3min.

According to the present embodiment, when the malfunction determining unit 23 determines that the malfunction occurs in the evaporation leakage checking system 10, the leakage checking unit 22 interrupts the checking operation of the evaporation leakage. Specifically, when the malfunction determining unit 23 determines that the malfunction occurs in the evaporation leakage checking system 10, the calculating unit 21 interrupts a calculation of the leakage threshold Pref.

When the malfunction determining unit 23 determines that the malfunction occurs in the evaporation leakage checking system 10, the ECU 20 notifies the driver that the evaporation leakage occurs in the evaporation leakage checking system 10 by lighting the indication lamp of the display device that is arranged in front of the driver's seat in the vehicle.

Next, referring to FIG. 5, a checking method of the evaporation leakage executed by the evaporation leakage checking system 10 according to the present embodiment will be described.

Figure 5:
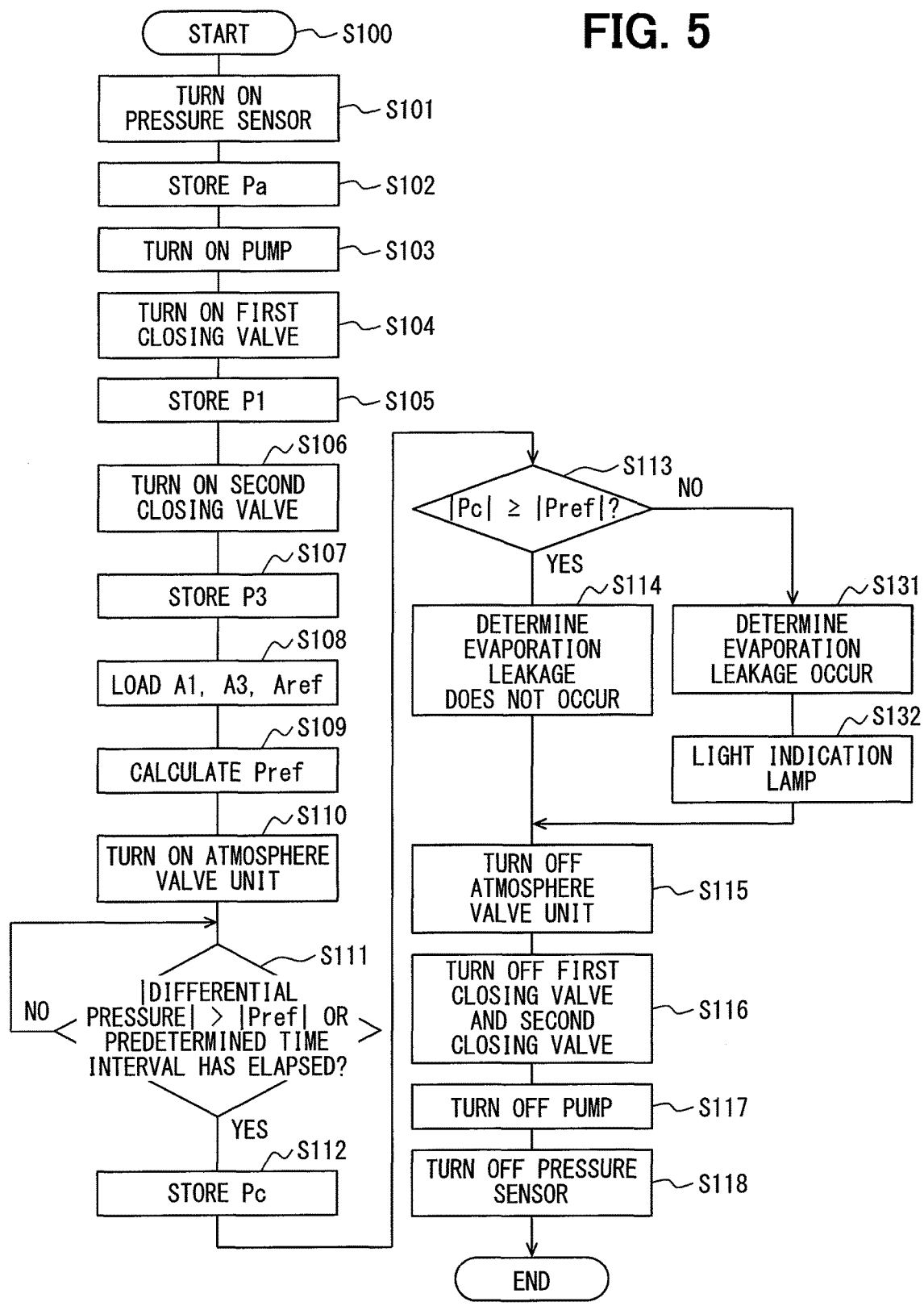
FIG. 5 is a flowchart showing a checking operation of an evaporation leakage executed by the evaporation leakage checking system, according to the first embodiment.

The ECU 20 of the evaporation leakage checking system 10 checks whether the evaporation leakage occurs at the fuel tank 2 by executing a checking operation from S100 shown in FIG. 5.

At S100, when a predetermined time interval has elapsed from a time point that the internal combustion engine is stopped, the checking operation is started. In this case, the predetermined time interval is set to be a time interval that is necessary to stabilize a temperature of the vehicle.

At S101, the ECU 20 turns on the pressure sensor 25 to start a sensing of the pressure by using the pressure sensor 25.

At S102, the ECU 20 stores the pressure sensed by the pressure sensor 25 as the atmospheric pressure Pa.

At S103, the ECU 20 starts the energization of the motor 15 of the pump 30 to start the operation of the pump 30.

At S104, the ECU 20 turns on the first closing valve 51 to open the first passage 431 of the specified passage unit 43. Thus, the flow-passage area of the specified passage unit 43 becomes the first area A1.

At S105, the ECU 20 stores the differential pressure between the pressure sensed by the pressure sensor 25 and the atmospheric pressure Pa, as the first pressure P1.

At S106, the ECU 20 turns on the second closing valve 52 to open the second passage 432 of the specified passage unit 43. Thus, the flow-passage area of the specified passage unit 43 becomes the second area A3.

At S107, the ECU 20 stores the differential pressure between the pressure sensed by the pressure sensor 25 and the atmospheric pressure Pa, as the second pressure P3.

At S108, the ECU 20 loads the first area A1, the second area A3, and the reference area Aref that are stored. In this case, the first area A1 and the second area A3 are set to be the maximum values by considering the above variations.

At S109, the ECU 20 calculates the leakage threshold Pref that is the threshold used to check whether the evaporation leakage occurs, based on the first pressure P1, the first area A1, the second pressure P3, the second area A3, and the reference area Aref.

At S110, the ECU 20 turns on the atmosphere closing valve 61 of the atmosphere valve unit 60 to close the first dividing passage 441 of the atmosphere passage unit 44. Thus, a pressure in the fuel tank 2 starts to be decreased by the pump 30 through the pump passage unit 41, the specified passage unit 43, and the tank passage unit 42.

At S111, the ECU 20 determines whether a first condition that an absolute value of the differential pressure between the pressure sensed by the pressure sensor 25 and the atmospheric pressure Pa is greater than the absolute value of the leakage threshold Pref, or a second condition that a predetermined time interval has elapsed since S110 is executed, is met. When the ECU 20 determines that the first condition or the second condition is met (S111: Yes), the ECU 20 proceeds to S112. When the ECU 20 determines that the first condition and the second condition are not met (S111: No), the ECU 20 returns to S111. In other words, S111 is repeatedly executed until the first condition or the second condition is met. The predetermined time interval in S111 is a time interval that is from a time point that the pressure in the fuel tank 2 starts to be decreased at S110 to a time point that the pressure in the fuel tank 2 or the pressure in the pump passage unit 41 is stabilized.

At S112, the ECU 20 stores the differential pressure between the pressure sensed by the pressure sensor 25 and the atmospheric pressure Pa, as the checking pressure Pc.

At S113, the ECU 20 determines whether the absolute value of the checking pressure Pc is greater than or equal to the absolute value of the leakage threshold Pref. When the ECU 20 determines that the absolute value of the checking pressure Pc is greater than or equal to the absolute value of the leakage threshold Pref (S113: Yes), the ECU 20 proceeds to S114. When the ECU 20 determines that the absolute value of the checking pressure Pc is less than the absolute value of the leakage threshold Pref (S113: No), the ECU 20 proceeds to S131.

At S114, the ECU 20 determines that the evaporation leakage does not occur at the fuel tank 2.

At S115, the ECU 20 turns off the atmosphere closing valve 61 of the atmosphere valve unit 60 to open the first dividing passage 441 of the atmosphere passage unit 44.

At S116, the ECU 20 turns off the first closing valve 51 and the second closing valve 52 of the flow-passage area changing unit 50 to close the first passage 431 and the second passage 432 of the specified passage unit 43.

At S117, the ECU 20 stops the energization of the motor 15 of the pump 30 to stop the operation of the pump 30.

At S118, the ECU 20 turns off the pressure sensor 25 to stop the sensing of the pressure by using the pressure sensor 25.

At S131, the ECU 20 determines that the evaporation leakage occurs at the fuel tank 2.

At S132, the ECU 20 lights the indication lamp of the display device that is arranged in front of the driver's seat in the vehicle.

As the above description, the ECU 20 functions as the calculating unit 21 at S109, and functions as the leakage checking unit 22 at S113, S114, and S131.

Next, referring to FIG. 6, an example of the checking operation of the evaporation leakage executed by the evaporation leakage checking system 10 according to the present embodiment will be described.

At S101, the ECU 20 turns on the pressure sensor 25 to start the sensing of the pressure by using the pressure sensor 25, at a time point t0.

At S102, the ECU 20 stores the pressure sensed by the pressure sensor 25 as the atmospheric pressure Pa at a time point t1.

At S103, the ECU 20 energizes the motor 15 of the pump 30 to start the operation of the pump 30 at a time point t2.

At S104, the ECU 20 turns on the first closing valve 51 to open the first passage 431 of the specified passage unit 43.

At S105, the ECU 20 stores the differential pressure between the pressure sensed by the pressure sensor 25 and the atmospheric pressure Pa, as the first pressure P1, at a time point t3.

At S106, the ECU 20 turns on the second closing valve 52 to open the second passage 432 of the specified passage unit 43 at a time point t4.

At S107, the ECU 20 stores the differential pressure between the pressure sensed by the pressure sensor 25 and the atmospheric pressure Pa, as the second pressure P3, at a time point t5.

At S110, the ECU 20 turns on the atmosphere closing valve 61 of the atmosphere valve unit 60 to close the first dividing passage 441 of the atmosphere passage unit 44 at a time point t6.

Figure 6:
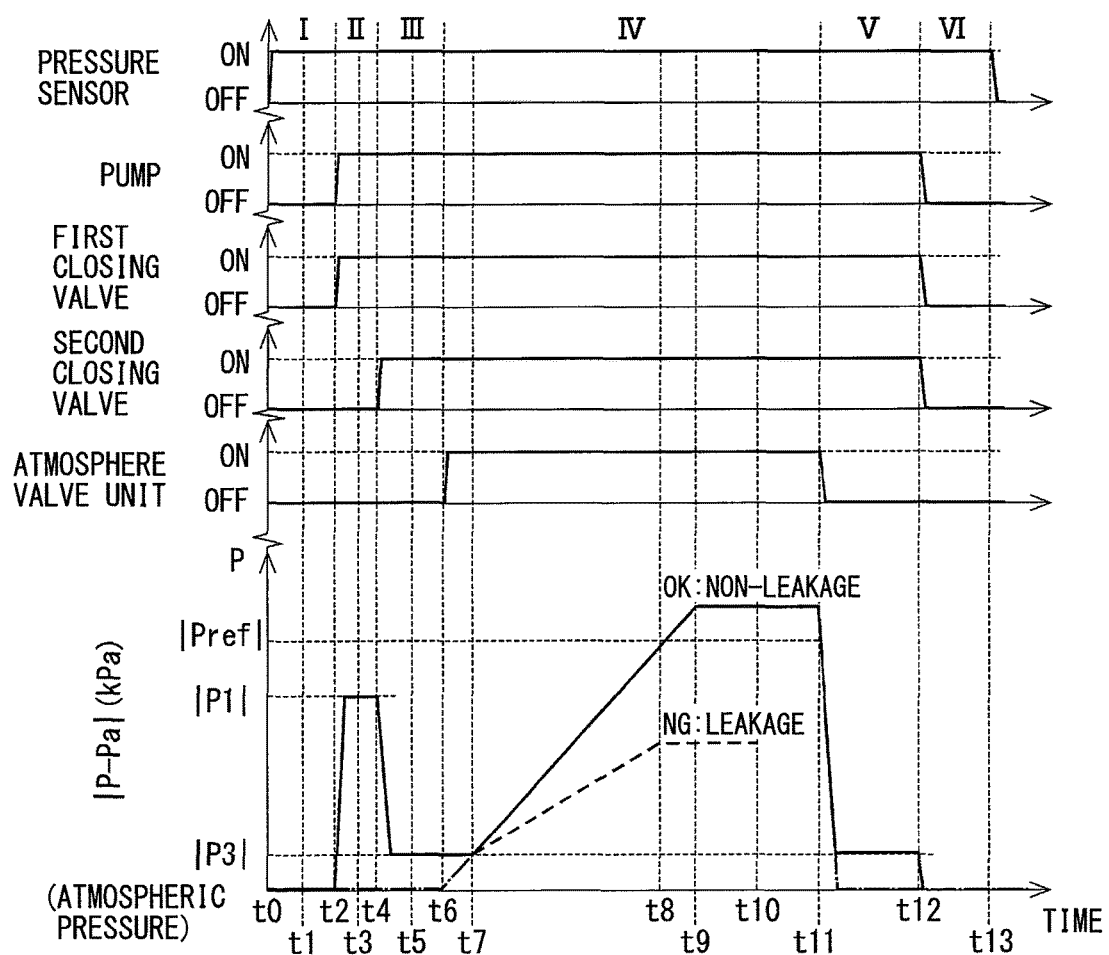
FIG. 6 is a time chart showing an example of the checking operation executed by the evaporation leakage checking system, according to the first embodiment.

As a bold dashed-dotted line shown in FIG. 6, since the pressure in the fuel tank 2 is gradually decreased after the time point t6, an absolute value of a differential pressure between the pressure in the fuel tank 2 and the atmospheric pressure Pa is gradually increased after the time point t6.

As a bold solid line shown in FIG. 6, when the air in the fuel tank 2 becomes void at a time point t7, an absolute value of the differential pressure between the pressure in the pump passage unit 41 that is the pressure sensed by the pressure sensor 25 and the atmospheric pressure Pa, and the absolute value of the differential pressure between the pressure in the fuel tank 2 and the atmospheric pressure Pa are equal to the absolute value of the second pressure P3. After the time point t7, the absolute value of the differential pressure between the pressure sensed by the pressure sensor 25 and the atmospheric pressure Pa, and the absolute value of the differential pressure between the pressure in the fuel tank 2 and the atmospheric pressure Pa are gradually increased.

When the evaporation leakage does not occur at the fuel tank 2, the absolute value of the differential pressure between the pressure sensed by the pressure sensor 25 and the atmospheric pressure Pa becomes constant at a time point t9.

When the evaporation leakage occurs at the fuel tank 2, the absolute value of the differential pressure between the pressure sensed by the pressure sensor 25 and the atmospheric pressure Pa becomes constant at a time point t8, as a bold dashed line shown in FIG. 6.

At S113, the ECU 20 determines whether the absolute value of the checking pressure Pc is greater than or equal to the absolute value of the leakage threshold Pref at a time point t10. When the evaporation leakage does not occur at the fuel tank 2, the absolute value of the checking pressure Pc is greater than or equal to the absolute value of the leakage threshold Pref. In this case, the ECU 20 proceeds to S114. At S114, the ECU 20 determines that the evaporation leakage does not occur at the fuel tank 2. When the evaporation leakage occurs at the fuel tank 2, the absolute value of the checking pressure Pc is less than the absolute value of the leakage threshold Pref. In this case, the ECU 20 proceeds to S131. At S131, the ECU 20 determines that the evaporation leakage occurs at the fuel tank 2.

At S115, the ECU 20 turns off the atmosphere closing valve 61 of the atmosphere valve unit 60 to open the first dividing passage 441 of the atmosphere passage unit 44 at a time point t11. Thus, the absolute value of the differential pressure between the pressure sensed by the pressure sensor 25 and the atmospheric pressure Pa is decreased to the absolute value of the second pressure P3. Further, the absolute value of the differential pressure between the pressure in the fuel tank 2 and the atmospheric pressure Pa is decreased to zero.

At S116, the ECU 20 turns off the first closing valve 51 and the second closing valve 52 of the flow-passage area changing unit 50 to close the first passage 431 and the second passage 432 of the specified passage unit 43 at a time point t12. At S117, the ECU 20 deenergizes the motor 15 of the pump 30 to stop the operation of the pump 30. In this case, the ECU 20 turns off the pump 30. Thus, the absolute value of the differential pressure between the pressure sensed by the pressure sensor 25 and the atmospheric pressure Pa is decreased to zero.

At S118, the ECU 20 turns off the pressure sensor 25 to stop the sensing of the pressure by using the pressure sensor 25 at a time point t13.

According to the above description, the evaporation leakage checking system 10 according to the present embodiment includes the pump 30, the pump passage unit 41, the tank passage unit 42, the specified passage unit 43, the atmosphere passage unit 44, the flow-passage area changing unit 50, the atmosphere valve unit 60, and the pressure sensor 25, and the ECU 20.

The pump passage unit 41 has the first end that is connected with the inlet 35 of the pump 30.

The tank passage unit 42 has the first end that is connected with the fuel tank 2 where the fuel is stored.

The specified passage unit 43 has the first end that is connected with the second end of the pump passage unit 41, and the second end that is connected with the second end of the tank passage unit 42.

The atmosphere passage unit 44 has the first end that is connected with the second end of the tank passage unit 42 and the second end of the specified passage unit 43, and the second end that is exposed to the atmosphere.

The flow-passage area changing unit 50 can change the flow-passage area of the specified passage unit 43 to three areas including the first area A1 and the second area A3.

The atmosphere valve unit 60 can change the flow-passage area of the atmosphere passage unit 44.

The pressure sensor 25 can sense the pressure in the pump passage unit 41.

The ECU 20 can control the operations of the pump 30, the flow-passage area changing unit 50, and the atmosphere valve unit 60.

According to the present embodiment, the ECU 20 includes the calculating unit 21 and the leakage checking unit 22.

The calculating unit 21 calculates the leakage threshold Pref that is the threshold used to check whether the evaporation leakage occurs, based on a first pressure P1 that is relative to the pressure sensed by the pressure sensor 25 in a case where the pump 30 is activated and the flow-passage area changing unit 50 changes the flow-passage area of the specified passage unit 43 to the area A1, a first area that is the area A1, a second pressure P3 that is relative to the pressure sensed by the pressure sensor 25 in a case where the pump 30 is activated and the flow-passage area changing unit 50 changes the flow-passage area of the specified passage unit 43 to the area A3, a second area that is the area A3, and a reference area Aref that is a predetermined area.

The leakage checking unit 22 activates the pump 30, closes the atmosphere passage unit 44 by changing the flow-passage area of the atmosphere passage unit 44 by using the atmosphere valve unit 60, and checks the existence of the evaporation leakage based on the leakage threshold Pref and a checking pressure Pc that is the pressure sensed by the pressure sensor 25 in a case where the communication between the tank passage unit 42 and the pump passage unit 41 is allowed.

The calculating unit 21 can estimate the PQ characteristic of the pump 30, based on the first pressure P1, the first area A1, the second pressure P3, and the second area A3. The calculating unit 21 can calculate the leakage threshold Pref based on the PQ characteristic of the pump 30 that is estimated and the reference area Aref that is predetermined. According to the present embodiment, since the air flows into the specified passage unit 43 having at least two flow-passage areas that are the first area A1 and the second area A3, the PQ characteristic of the pump 30 is estimated and the leakage threshold Pref is calculated. When the reference area Aref is set to an arbitrary value, the leakage threshold Pref corresponding to the reference area Aref can be calculated. Thus, when a standard of an emission regulation of the evaporation is changed or when standards of the emission regulation of the evaporation are different in plural countries and regions, the leakage threshold Pref can be calculated according to a reference in a case where a value of the reference area Aref is set according to the reference, without changing a diameter of an orifice as a conventional technology. Thus, the evaporation leakage checking system 10 and the checking method can be flexibly applied to the standard of the emission regulation of the evaporation.

According to the present embodiment, when the absolute value of the checking pressure Pc is less than the absolute value of the leakage threshold Pref, the leakage checking unit 22 determines that the evaporation leakage occurs. According to the present embodiment, an existence of the evaporation leakage is checked based on an absolute value of a pressure. Thus, in a configuration where the pump 30 increases the pressure in the fuel tank 2 and the pump passage unit 41, the existence of the evaporation leakage can be checked by using the same method.

According to the present embodiment, the calculating unit 21 calculates the leakage threshold Pref, based on the dimension variation in manufacturing the first area A1 and the second area A3, the dimension variation generated due to the temperature variation and the humidity variation, and the sensing errors of the first pressure P1 and the second pressure P3.

However, it is necessary that the values of the first area A1 and the second area A3 are inputted to be stored in a memory of the ECU 20 before the vehicle is delivered. When an assembling subject is determined, it costs time to input the above values. Variations of the first area A1 and the second area A3 can be previously inputted as the present embodiment, and it does cost time when the vehicle is assembled. When the leakage threshold Pref is set to a maximum value by considering the variations of the first area A1 and the second area A3, a fuel negative error generated relative to the emission regulation of the evaporation can be prevented.

According to the present embodiment, the checking module 11 includes the first orifice member 71 that includes the opening having the area A1, and the second orifice member 72 that includes the opening having the area A2. The first orifice member 71 and the second orifice member 72 are arranged in the specified passage unit 43.

The first orifice member 71 and the second orifice member 72 have all of characteristics that the linear expansion coefficients are less than that of the member constituting the specified passage unit 43, the variations of dimension generated due to the water absorbing are less than that of the member constituting the specified passage unit 43, the variations of dimension generated due to the fuel that is exposed are less than that of the member constituting the specified passage unit 43, and the variations of opening areas generated due to the magnesium chloride solution, the calcium chloride solution, or the natrium chloride solution that is exposed are less than that of the member constituting the specified passage unit 43. Thus, the first orifice member 71 and the second orifice member 72 have variations of dimension generated due to a heat less than that of the specified passage unit 43, the variations of dimension generated due to the water absorbing less than that of the specified passage unit 43, the variations of dimension generated due to the fuel that is exposed less than that of the specified passage unit 43, and the variations of opening areas generated due to the magnesium chloride solution, the calcium chloride solution, or the natrium chloride solution that is exposed less than that of the specified passage unit 43. Thus, the first area A1 and the second area A3 are stable without respect to a secular change or an environmental change, and the existence of the evaporation leakage can be accurately determined.

According to the present embodiment, the ECU 20 includes the malfunction determining unit 23 determining that the malfunction occurs in the evaporation leakage checking system 10 in a case where the first pressure P1 or the second pressure P3 is out of the range obtained based on the first area A1 and the second area A3. In this case, the range is also obtained based on the variation of the characteristic of the pump 30.

According to the present embodiment, when the malfunction determining unit 23 determines that the malfunction occurs in the evaporation leakage checking system 10, the leakage checking unit 22 interrupts the checking operation of the evaporation leakage.

According to the present embodiment, when the malfunction determining unit 23 determines that the malfunction occurs in the evaporation leakage checking system 10, the calculating unit 21 interrupts the calculation of the leakage threshold Pref.

According to the present embodiment, it can be prevented by the malfunction determining unit 23 that the checking operation of the evaporation leakage is executed in a case where the malfunction occurs in the evaporation leakage checking system 10.

According to the present embodiment, the first end of the pump passage unit 41 is connected with the inlet 35 of the pump 30. Thus, the pump 30 can decrease the pressure in the pump passage unit 41. When an opening that can cause the evaporation leakage is formed at the fuel tank 2, it can be prevented that the evaporation flows through the opening to an exterior of the fuel tank 2 in a case where the checking operation of the evaporation leakage is executed. In this case, when the checking operation of the evaporation leakage is executed, the pump 30 is activated.

According to the present embodiment, the pump 30 is a vane pump including the casing 31, the rotor 37 that is rotatably arranged in the casing 31 and includes the groove portion 38 arranged at an outer wall of the rotor 37, and the vane 39 that is arranged in the groove portion 38 and reciprocates in the radial direction of the rotor 37 and is a plate shape. The vane pump indicates the PQ characteristic that a variation of the pressure becomes small relative to a variation of the opening area. Thus, according to the present embodiment, the existence of the evaporation leakage can be accurately determined.

According to the present embodiment, the checking method of the evaporation leakage by using the evaporation leakage checking system 10 includes following processings.

At a first processing that is S101, the ECU 20 starts the sensing of the pressure by using the pressure sensor 25.

At a second processing that is S103, the ECU 20 starts the operation of the pump 30.

At a third processing that is S105, the ECU 20 stores a pressure relative to the pressure sensed by the pressure sensor 25 as the first pressure P1 in a case where the flow-passage area of the specified passage unit 43 is the first area A1.

At a fourth processing that is S106, the ECU 20 controls the flow-passage area changing unit 50 to change the flow-passage area of the specified passage unit 43 to the second area A3.

At a fifth processing that is S107, the ECU 20 stores a pressure relative to the pressure sensed by the pressure sensor 25 as the second pressure P3 in a case where the flow-passage area of the specified passage unit 43 is the second area A3.

At a sixth processing that is S109, the ECU 20 calculates the leakage threshold Pref that is the threshold used to check whether the evaporation leakage that is the leakage of the evaporated fuel occurs, based on the first pressure P1, the first area A1, the second pressure P3, the second area A3, and the reference area Aref that is determined.

At a seventh processing that is S110, the ECU 20 controls the atmosphere valve unit 60 to change the flow-passage area of the atmosphere passage unit 44 and close the atmosphere passage unit 44.

At an eighth processing that is S113, S114, S131, the ECU 20 checks the existence of the evaporation leakage, based on the checking pressure Pc that is the pressure sensed by the pressure sensor 25 after the predetermined time interval has elapsed since the seventh processing is executed in a case where the communication between the tank passage unit 42 and the pump passage unit 41 is allowed, and the leakage threshold Pref.

In the checking method according to the present embodiment, when a standard of an emission regulation of the evaporation is changed or when standards of the emission regulation of the evaporation are different in plural countries and regions, the leakage threshold Pref can be calculated according to a reference in a case where a value of the reference area Aref is set according to the reference, without changing a diameter of an orifice as a conventional technology. Thus, the evaporation leakage checking system and the checking method can be flexibly applied to the standard of the emission regulation of the evaporation.

According to the present embodiment, at the eighth processing that is S113, S131, when the absolute value of the checking pressure Pc is less than the absolute value of the leakage threshold Pref, the ECU 20 determines that the evaporation leakage occurs. According to the present embodiment, the existence of the evaporation leakage is checked based on the absolute value of the pressure. Thus, in the configuration where the pump 30 increases the pressure in the fuel tank 2 and the pump passage unit 41, the existence of the evaporation leakage can be checked by using the same method.

Second Embodiment

Figure 7:
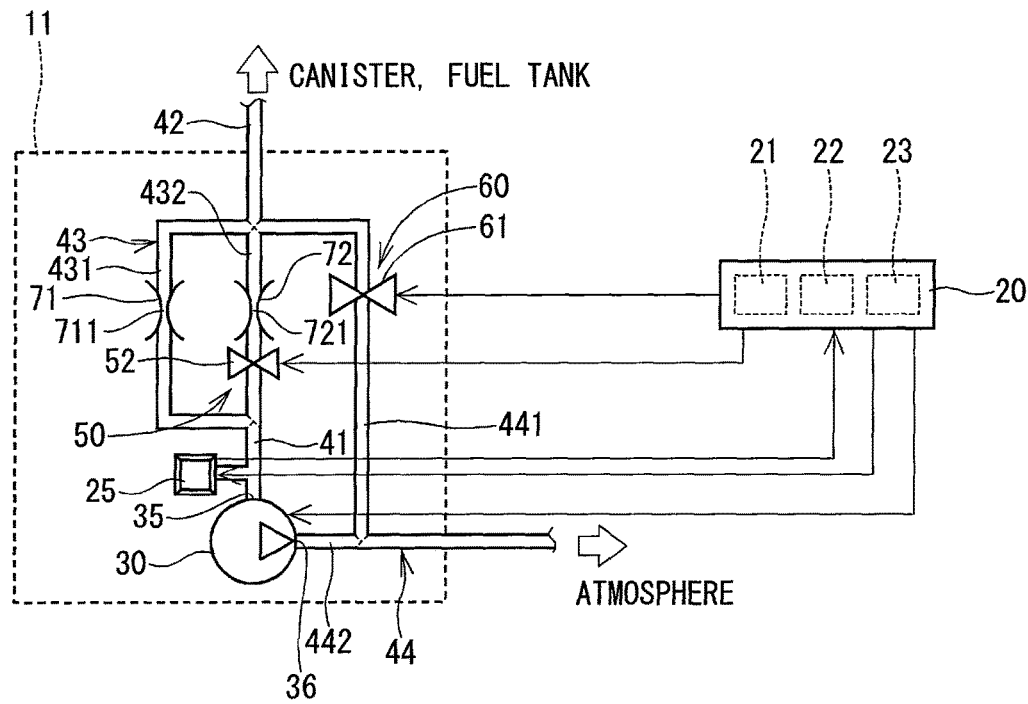
FIG. 7 is a schematic diagram showing the evaporation leakage checking system, according a second embodiment of the present disclosure.

The evaporation leakage checking system according to a second embodiment of the present disclosure is shown in FIG. 7. According to the second embodiment, a total number of members is different from that in the first embodiment.

According to the second embodiment, the flow-passage area changing unit 50 does not include the first closing valve 51.

According to the second embodiment, the evaporation leakage checking system has the same configuration as that in the first embodiment except the above matters.

According to the second embodiment, S104 where the first closing valve 51 is turned on in the first embodiment can be cancelled.

As the above description, the total number of members in the second embodiment is less than that of the first embodiment, and the processings can be simplified.

Third Embodiment

Figure 8:
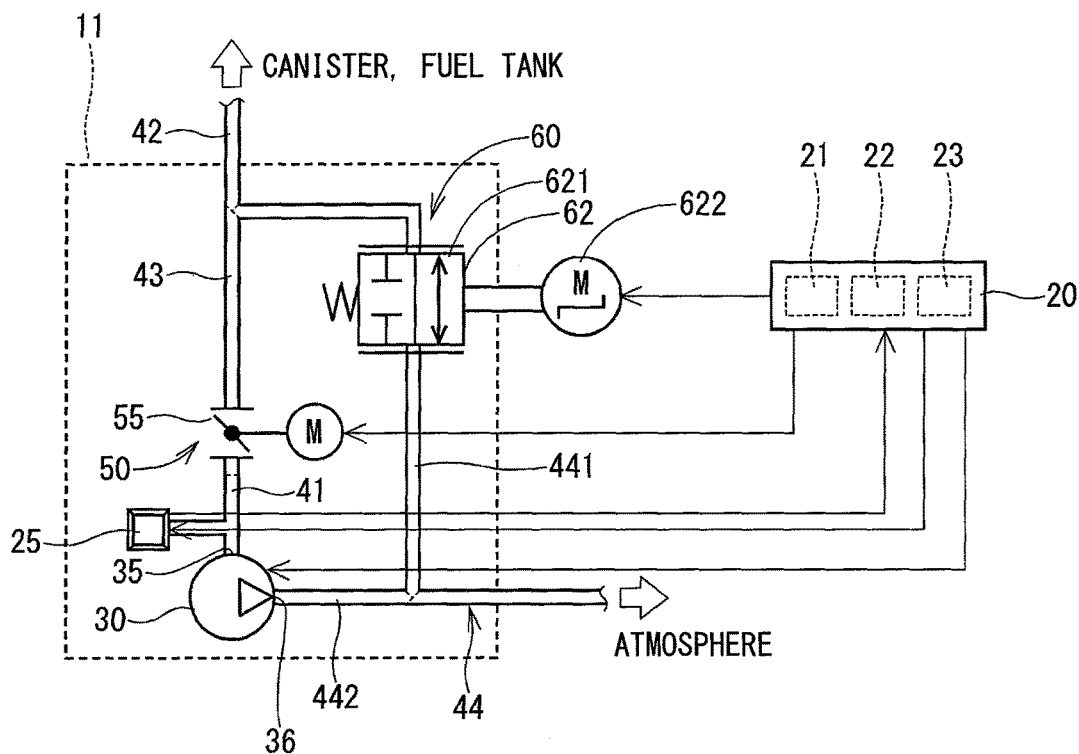
FIG. 8 is a schematic diagram showing the evaporation leakage checking system, according a third embodiment of the present disclosure.

The evaporation leakage checking system according to a third embodiment of the present disclosure is shown in FIG. 8.

According to the third embodiment, the specified passage unit 43 includes the first end connected with the second end of the pump passage unit 41, and the second end connected with the second end of the tank passage unit 42.

The flow-passage area changing unit 50 includes a first opening variable valve 55. According to the present embodiment, the first opening variable valve 55 is a butterfly valve that has a valve portion that is a plate shape and rotates when the butterfly valve is energized. The first opening variable valve 55 is arranged in the specified passage unit 43. When the first opening variable valve 55 is energized, the first opening variable valve 55 changes an opening position to change the flow-passage area of the specified passage unit 43. According to the present embodiment, the flow-passage area changing unit 50 can change the flow-passage area of the specified passage unit 43 to two areas including the first area A1 and a second area A2 by changing the opening position of the first opening variable valve 55.

The atmosphere valve unit 60 includes a second opening variable valve 62. The second opening variable valve 62 includes a valve portion 621 and a driving portion 622.

The valve portion 621 is arranged in the first dividing passage 441 of the atmosphere passage unit 44. According to the present embodiment, the driving portion 622 is a stepping motor that controls a rotation position with plural steps when the stepping motor is energized. The driving portion 622 can change a position of the valve portion 621 in the first dividing passage 441 by driving, and can change an opening position of the second opening variable valve 62. Thus, the driving portion 622 can open and close the first dividing passage 441 of the atmosphere passage unit 44. The second opening variable valve 62 normally opens the first dividing passage 441.

According to the present embodiment, the flow-passage area changing unit 50 includes the second opening variable valve 62. Specifically, the flow-passage area changing unit 50 can change the opening of the second opening variable valve 62 of the atmosphere valve unit 60 by using the driving portion 622 to change the flow-passage area of the first dividing passage 441 of the atmosphere passage unit 44. The flow-passage area changing unit 50 can change a substantial flow-passage area of the specified passage unit 43 to two areas including the first area A1 and the second area A2 by changing the opening position of the second opening variable valve 62.

Next, referring to FIG. 9, the checking method of the evaporation leakage executed by the evaporation leakage checking system according to the present embodiment will be described.

Figure 9:
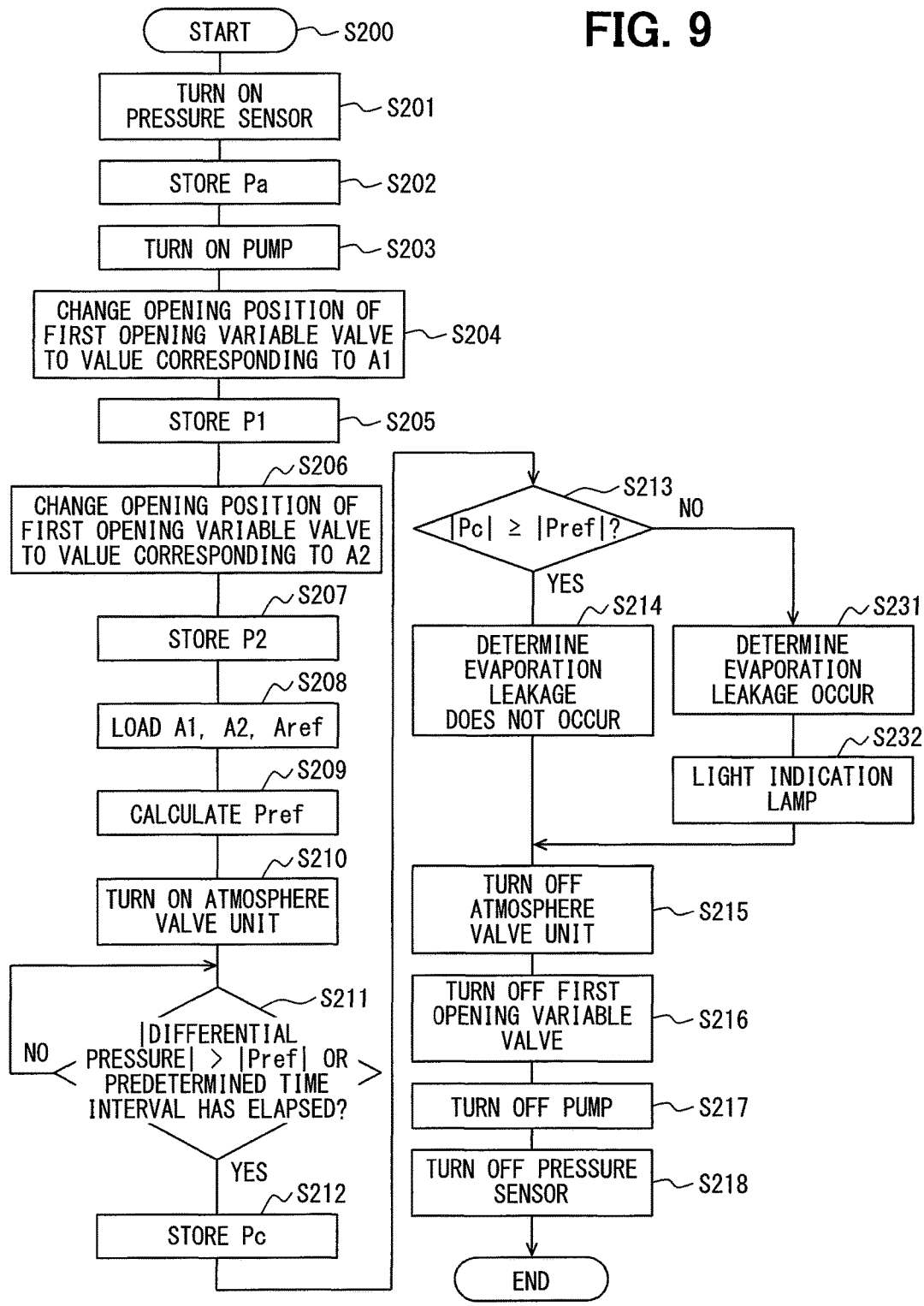
FIG. 9 is a flowchart showing the checking operation of the evaporation leakage executed by the evaporation leakage checking system, according to the third embodiment.

The ECU 20 of the evaporation leakage checking system checks whether the evaporation leakage occurs at the fuel tank 2 by executing a checking operation from S200 shown in FIG. 9.

At S200, when a predetermined time interval has elapsed from the time point that the internal combustion engine is stopped, the checking operation is started. In this case, the predetermined time interval is set to be a time interval that is necessary to stabilize the temperature of the vehicle.

At S201, the ECU 20 turns on the pressure sensor 25 to start the sensing of the pressure by using the pressure sensor 25.

At S202, the ECU 20 stores the pressure sensed by the pressure sensor 25 as the atmospheric pressure Pa.

At S203, the ECU 20 starts the energization of the motor 15 of the pump 30 to start the operation of the pump 30.

At S204, the ECU 20 changes the opening position of the first opening variable valve 55 to a value corresponding to the first area A1. Thus, the flow-passage area of the specified passage unit 43 becomes the first area A1.

At S205, the ECU 20 stores the differential pressure between the pressure sensed by the pressure sensor 25 and the atmospheric pressure Pa, as the first pressure P1.

At S206, the ECU 20 changes the opening position of the first opening variable valve 55 to a value corresponding to the second area A2. Thus, the flow-passage area of the specified passage unit 43 becomes the second area A2.

At S207, the ECU 20 stores the differential pressure between the pressure sensed by the pressure sensor 25 and the atmospheric pressure Pa, as the second pressure P2.

At S208, the ECU 20 loads the first area A1, the second area A2, and the reference area Aref that are stored. According to the present embodiment, the first area A1 and the second area A2 are set to be the maximum values by considering the above variations as the same as the first area A1 and the second area A3 in the first embodiment.

At S209, the ECU 20 calculates the leakage threshold Pref that is the threshold used to check whether the evaporation leakage occurs, based on the first pressure P1, the first area A1, the second pressure P2, the second area A2, and the reference area Aref.

At S210, the ECU 20 drives the second opening variable valve 62 of the atmosphere valve unit 60 to close the first dividing passage 441 of the atmosphere passage unit 44. Thus, the pressure in the fuel tank 2 starts to be decreased by the pump 30 through the pump passage unit 41, the specified passage unit 43, and the tank passage unit 42.

At S211, the ECU 20 determines whether the first condition or a second condition that a predetermined time interval has elapsed since S210 is executed, is met. When the ECU 20 determines that the first condition or the second condition is met (S211: Yes), the ECU 20 proceeds to S212. When the ECU 20 determines that the first condition and the second condition are not met (S211: No), the ECU 20 returns to S211. In other words, S211 is repeatedly executed until the first condition or the second condition is met. The predetermined time interval in S211 is a time interval that is from a time point that the pressure in the fuel tank 2 starts to be decreased at S210 to the time point that the pressure in the fuel tank 2 or the pressure in the pump passage unit 41 is stabilized.

At S212, the ECU 20 stores the differential pressure between the pressure sensed by the pressure sensor 25 and the atmospheric pressure Pa, as the checking pressure Pc.

At S213, the ECU 20 determines whether the absolute value of the checking pressure Pc is greater than or equal to the absolute value of the leakage threshold Pref. When the ECU 20 determines that the absolute value of the checking pressure Pc is greater than or equal to the absolute value of the leakage threshold Pref (S213: Yes), the ECU 20 proceeds to S214. When the ECU 20 determines that the absolute value of the checking pressure Pc is less than the absolute value of the leakage threshold Pref (S213: No), the ECU 20 proceeds to S231.

At S214, the ECU 20 determines that the evaporation leakage does not occur at the fuel tank 2.

At S215, the ECU 20 drives the second opening variable valve 62 of the atmosphere valve unit 60 to open the first dividing passage 441 of the atmosphere passage unit 44.

At S216, the ECU 20 drives the first opening variable valve 55 of the flow-passage area changing unit 50 to close the specified passage unit 43.

At S217, the ECU 20 stops the energization of the motor 15 of the pump 30 to stop the operation of the pump 30.

At S218, the ECU 20 turns off the pressure sensor 25 to stop the sensing of the pressure by using the pressure sensor 25.

At S231, the ECU 20 determines that the evaporation leakage occurs at the fuel tank 2.

At S232, the ECU 20 lights the indication lamp of the display device that is arranged in front of the driver's seat in the vehicle.

According to the present embodiment, the first opening variable valve 55 of the flow-passage area changing unit 50 may be always open, at S204, the opening position of the second opening variable valve 62 of the atmosphere valve unit 60 may be equivalent to the first area A1, and the substantial flow-passage area of the specified passage unit 43 may be the first area A1. At S206, the opening position of the second opening variable valve 62 of the atmosphere valve unit 60 may be equivalent to the second area A2, and the substantial flow-passage area of the specified passage unit 43 may be the second area A2.

As the above description, according to the present embodiment, the flow-passage area changing unit 50 includes the first opening variable valve 55 having the opening position that can be changed to change the flow-passage area of the specified passage unit 43. The flow-passage area changing unit 50 can change the flow-passage area of the specified passage unit 43 to two areas including the first area A1 and the second area A2, by changing the opening position of the first opening variable valve 55.

According to the present embodiment, the flow-passage area changing unit 50 can change the opening position of the second opening variable valve 62 of the atmosphere valve unit 60 to change the flow-passage area of the atmosphere passage unit 44. The flow-passage area changing unit 50 can change the substantial flow-passage area of the specified passage unit 43 to two areas including the first area A1 and the second area A2, by changing the opening position of the second opening variable valve 62.

According to the present embodiment, a configuration of the specified passage unit 43 is more simplified than that in the first embodiment, orifice members including the first orifice member 71 and the second orifice member 72 are cancelled, and the evaporation leakage checking system and the checking method can be flexibly applied to the standard of the emission regulation of the evaporation.

Fourth Embodiment

Figure 10:
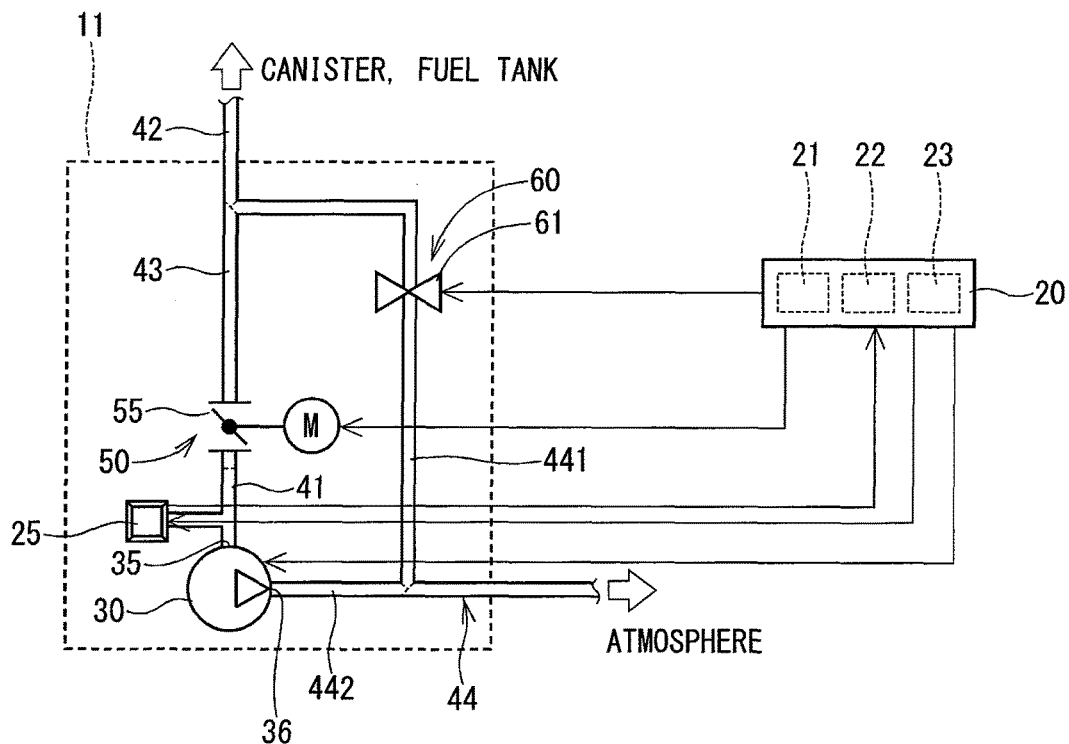
FIG. 10 is a schematic diagram showing the evaporation leakage checking system, according to a fourth embodiment of the present disclosure.

The evaporation leakage checking system according to a fourth embodiment of the present disclosure is shown in FIG. 10. According to the fourth embodiment, a configuration of the atmosphere valve unit 60 is different from that in the third embodiment.

According to the fourth embodiment, the atmosphere valve unit 60 includes the atmosphere closing valve 61 mentioned in the first embodiment instead of the second opening variable valve 62 mentioned in the third embodiment.

According to the fourth embodiment, the evaporation leakage checking system has the same configuration as that in the third embodiment except the above matters.

According to the fourth embodiment, S210 mentioned in the third embodiment is replaced by S110, S215 mentioned in the third embodiment is replaced by S115, and the existence of the evaporation leakage can be checked as the same as the third embodiment.

According to the fourth embodiment, the evaporation leakage checking system costs smaller than and becomes more simplified than that in the third embodiment.

Fifth Embodiment

Figure 11:
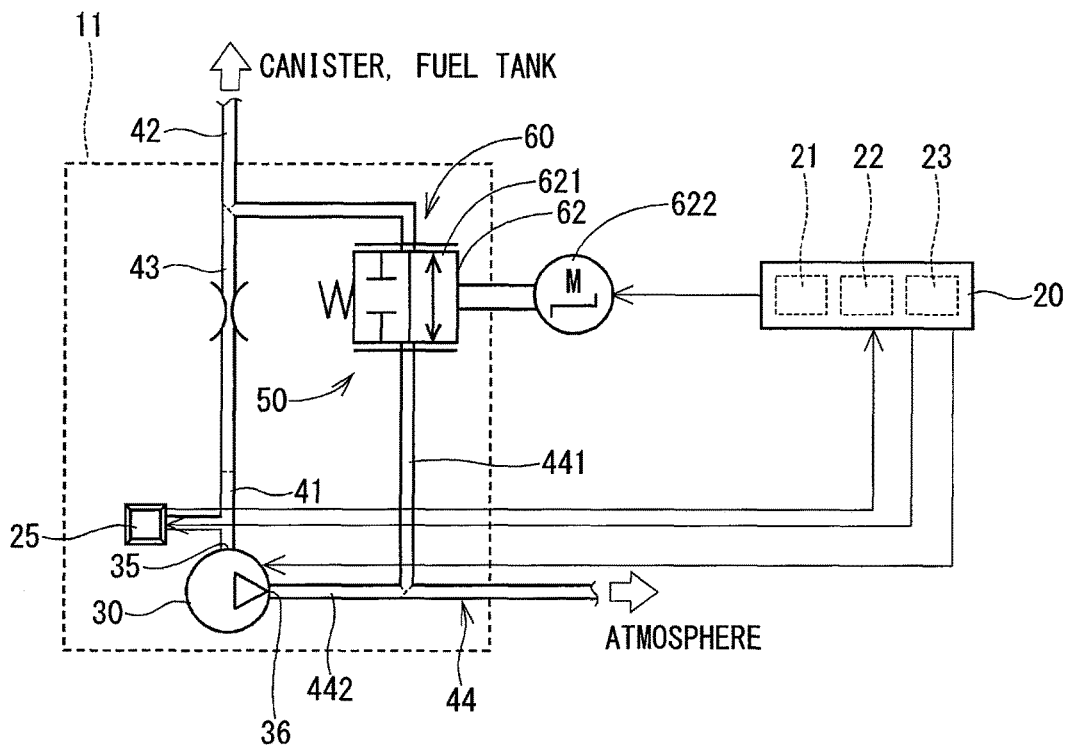
FIG. 11 is a schematic diagram showing the evaporation leakage checking system, according to a fifth embodiment of the present disclosure.

The evaporation leakage checking system according to a fifth embodiment of the present disclosure is shown in FIG. 11. According to the fifth embodiment, a configuration of the evaporation leakage checking system is different from that in the third embodiment.

According to the fifth embodiment, the checking module 11 includes an orifice member 75 instead of the first opening variable valve 55 mentioned in the third embodiment.

The orifice member 75 is made of a metal such as a stainless.

The orifice member 75 includes an opening 751 having an area that is the area A2. Thus, the flow-passage area of the specified passage unit 43 is equivalent to the area A2 of the opening 751.

According to the present embodiment, the flow-passage area changing unit 50 includes an opening variable valve 62. The flow-passage area changing unit 50 can change the opening position of the opening variable valve 62 of the atmosphere valve unit 60 by using the driving portion 622 to change the flow-passage area of the first dividing passage 441 of the atmosphere passage unit 44. The flow-passage area changing unit 50 can change the substantial flow-passage area of the specified passage unit 43 to two areas including the first area A1 and the second area A2, by changing the opening position of the opening variable valve 62.

According to the fifth embodiment, the evaporation leakage checking system has the same configuration as that in the third embodiment except the above matters.

According to the fifth embodiment, at S204, the opening position of the opening variable valve 62 of the atmosphere valve unit 60 may be equivalent to the first area A1. Further, when the opening position of the opening variable valve 62 becomes greater than or equal to the second area A2 at S206, the existence of the evaporation leakage can be checked as the same as the third embodiment.

According to the fifth embodiment, the evaporation leakage checking system costs smaller than and becomes more simplified than that in the third embodiment.

Sixth Embodiment

The evaporation leakage checking system according to a sixth embodiment of the present disclosure is shown in FIG. 12. According to the sixth embodiment, a configuration of the evaporation leakage checking system is different from that in the first embodiment.

According to the sixth embodiment, the flow-passage area changing unit 50 does not include the first closing valve 51 and the second closing valve 52. The atmosphere valve unit 60 includes a switching valve 63 instead of the atmosphere closing valve 61 mentioned in the first embodiment.

The switching valve 63 includes a valve portion 631 and a driving portion 632.

The valve portion 631 is made of a resin, and includes a specified passage 435 and an atmosphere passage 445. According to the present embodiment, the second orifice member 72 is arranged in the specified passage 435. Thus, a flow-passage area of the specified passage 435 is equivalent to the area A2 of the second opening 721. The valve portion 631 can reciprocate between the second passage 432 of the specified passage unit 43 and the first dividing passage 441 of the atmosphere passage unit 44.

Figure 12A:
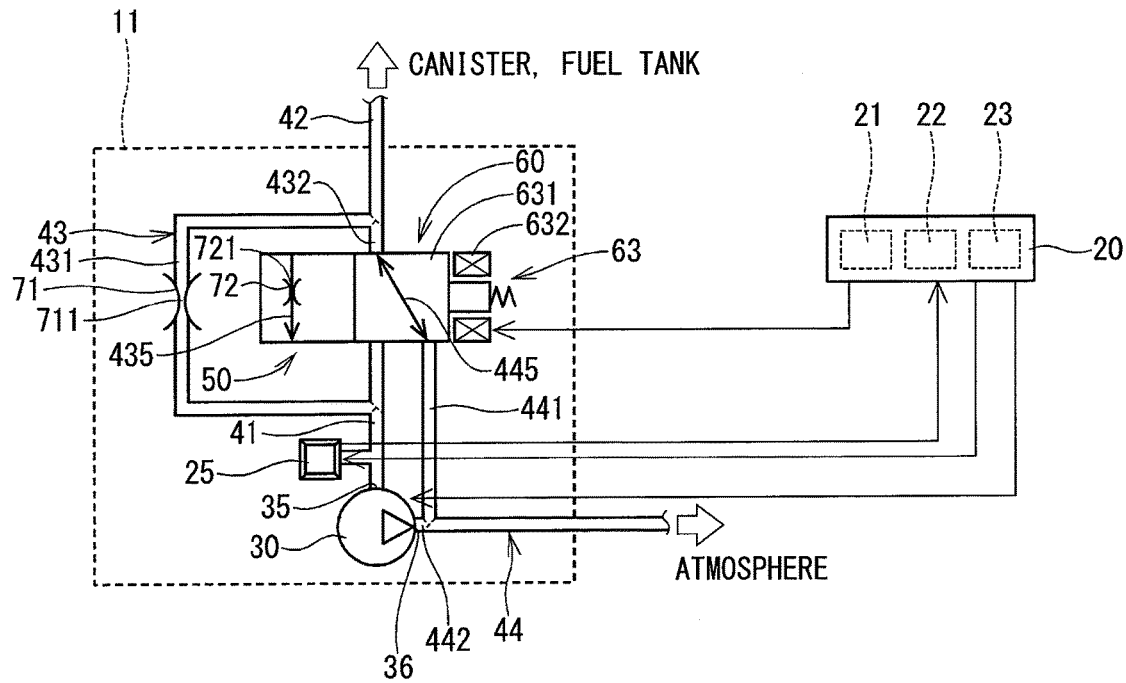
FIG. 12A is a schematic diagram showing the evaporation leakage checking system in a case where an atmosphere valve portion is turned off, according to a sixth embodiment of the present disclosure.

The driving portion 632 is a solenoid, and can change a position of the valve portion 631 when being energized. As shown in FIG. 12A, when the driving portion 632 is deenergized or turned off, the valve portion 631 is placed at a position where the atmosphere passage 445 communicates with the first dividing passage 441 and the second end of the second passage 432 to communicate with the tank passage unit 42 and a communication between the first end and the second end of the second passage 432 is interrupted. In this case, the flow-passage area of the specified passage unit 43 becomes the first area A1.

Figure 12B:
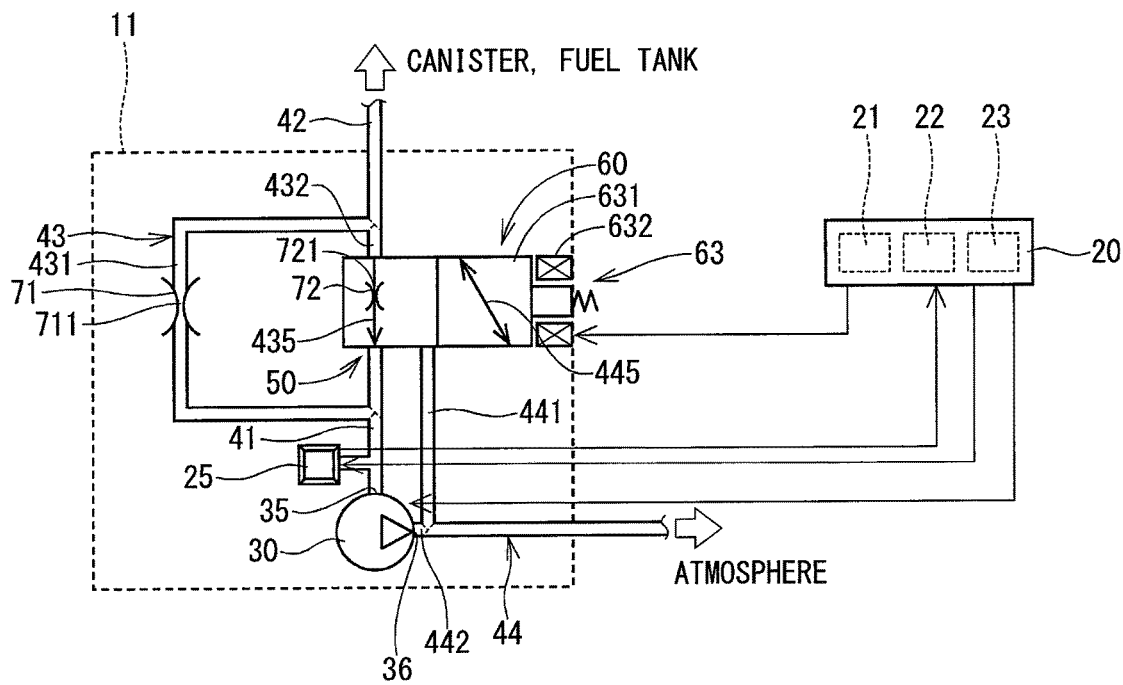
FIG. 12B is a schematic diagram showing the evaporation leakage checking system in a case where the atmosphere valve portion is turned on, according to the sixth embodiment.

As shown in FIG. 12B, when the driving portion 632 is energized or turned on, the valve portion 631 is placed at a position where the specified passage 435 communicates with the first end and the second end of the second passage 432 and a communication between the first dividing passage 441 and the second end of the second passage 432 is interrupted. In this case, the flow-passage area of the specified passage unit 43 becomes the second area A3 that is a sum of the area A1 and the area A2.

As the above description, the switching valve 63 can switch between a first state and a second state. In the first state, as shown in FIG. 12A, a communication between the tank passage unit 42 and the atmosphere passage unit 44 is allowed, and the communication between the tank passage unit 42 and the pump passage unit 41 is interrupted. In the second state, as shown in FIG. 12B, the communication between the tank passage unit 42 and the atmosphere passage unit 44 is interrupted, and the communication between the tank passage unit 42 and the pump passage unit 41 is allowed.

According to the present embodiment, the flow-passage area changing unit 50 includes the switching valve 63.

Next, referring to FIG. 13, the checking method of the evaporation leakage executed by the evaporation leakage checking system according to the present embodiment will be described.

Figure 13:
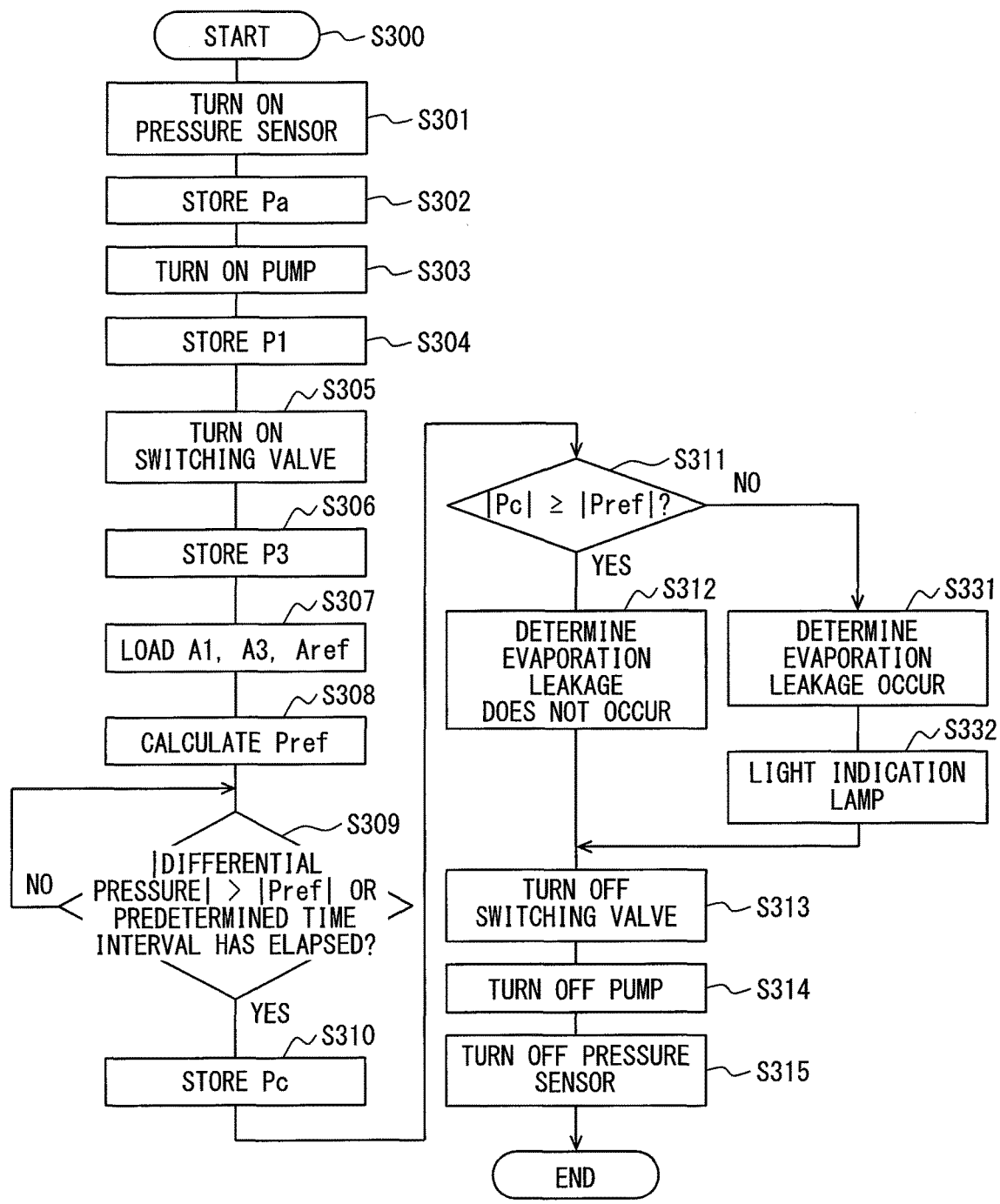
FIG. 13 is a flowchart showing the checking operation of the evaporation leakage executed by the evaporation leakage checking system, according to the sixth embodiment.

The ECU 20 of the evaporation leakage checking system checks whether the evaporation leakage occurs at the fuel tank 2, by executing a checking operation from S300 shown in FIG. 13.

At S300, when a predetermined time interval has elapsed from the time point that the internal combustion engine is stopped, the checking operation is started. In this case, the predetermined time interval is set to be a time interval that is necessary to stabilize the temperature of the vehicle.

At S301, the ECU 20 turns on the pressure sensor 25 to start the sensing of the pressure by using the pressure sensor 25.

At S302, the ECU 20 stores the pressure sensed by the pressure sensor 25 as the atmospheric pressure Pa.

At S303, the ECU 20 energizes the motor 15 of the pump 30 to start the operation of the pump 30.

At S304, the ECU 20 stores the differential pressure between the pressure sensed by the pressure sensor 25 and the atmospheric pressure Pa, as the first pressure P1.

At S305, the ECU 20 turns on the switching valve 63 to move the valve portion 631 to a position shown in FIG. 12B. Thus, the flow-passage area of the specified passage unit 43 becomes the second area A3. In this case, since the communication between the first dividing passage 441 and the second passage 432 is interrupted, the pressure in the fuel tank 2 starts to be decreased by the pump 30 through the pump passage unit 41, the specified passage unit 43, the specified passage 435, and the tank passage unit 42.

At S306, the ECU 20 stores the differential pressure between the pressure sensed by the pressure sensor 25 and the atmospheric pressure Pa, as the second pressure P3.

At S307, the ECU 20 loads the first area A1, the second area A3, and the reference area Aref that are stored. In this case, the first area A1 and the second area A3 are set to be the maximum values by considering the above variations.

At S308, the ECU 20 calculates the leakage threshold Pref that is the threshold used to check the existence of the evaporation leakage, based on the first pressure P1, the first area A1, the second pressure P3, the second area A3, and the reference area Aref.

At S309, the ECU 20 determines whether the first condition or a second condition that a predetermined time interval has elapsed since S305 is executed, is met. When the ECU 20 determines that the first condition or the second condition is met (S309: Yes), the ECU 20 proceeds to S310. When the ECU 20 determines that the first condition and the second condition are not met (S309: No), the ECU 20 returns to S309. In other words, S309 is repeatedly executed until the first condition or the second condition is met. The predetermined time interval in S309 is less than a time interval that is from a time point that the pressure in the fuel tank 2 starts to be decreased at S305 to a time point that the air in the fuel tank 2 becomes void.

At S310, the ECU 20 stores the differential pressure between the pressure sensed by the pressure sensor 25 and the atmospheric pressure Pa, as the checking pressure Pc.

At S311, the ECU 20 determines whether the absolute value of the checking pressure Pc is greater than or equal to the absolute value of the leakage threshold Pref. When the ECU 20 determines that the absolute value of the checking pressure Pc is greater than or equal to the absolute value of the leakage threshold Pref (S311: Yes), the ECU 20 proceeds to S312. When the ECU 20 determines that the absolute value of the checking pressure Pc is less than the absolute value of the leakage threshold Pref (S311: No), the ECU 20 proceeds to S331.

At S312, the ECU 20 determines that the evaporation leakage does not occur as the fuel tank 2.

At S313, the ECU 20 turns off the switching valve 63 to move the valve portion 631 to a position shown in FIG. 12A. Thus, the atmosphere passage 445 communicates with the first dividing passage 441 and the second passage 432.

At S314, the ECU 20 stops the energization of the motor 15 of the pump 30 to stop the operation of the pump 30.

At S315, the ECU 20 turns off the pressure sensor 25 to stop the sensing of the pressure by using the pressure sensor 25.

At S331, the ECU 20 determines that the evaporation leakage occurs at the fuel tank 2.

At S332, the ECU 20 lights the indication lamp of the display device that is arranged in front of the driver's seat in the vehicle.

Next, referring to FIG. 14, an example of the checking operation executed by the evaporation leakage checking system 10 according to the present embodiment will be described.

At S301, the ECU 20 turns of the pressure sensor 25 at a time point t0 to start the sensing of the pressure by using the pressure sensor 25.

At S302, the ECU 20 stores the pressure sensed by the pressure sensor 25 as the atmospheric pressure Pa at a time point t1.

At S303, the ECU 20 energizes the motor 15 of the pump 30 to start the operation of the pump 30 at a time point t2.

At S304, the ECU 20 stores the differential pressure between the pressure sensed by the pressure sensor 25 and the atmospheric pressure Pa as the first pressure P1 at a time point t3.

At S305, the ECU 20 turns on the switching valve 63 to change the flow-passage area of the specified passage unit 43 to be the second area A3 and to interrupt the communication between the first dividing passage 441 and the second passage 432, at a time point t4.

At S306, the ECU 20 stores the differential pressure between the pressure sensed by the pressure sensor 25 and the atmospheric pressure Pa at the second pressure P3, at a time point t5.

Figure 14:
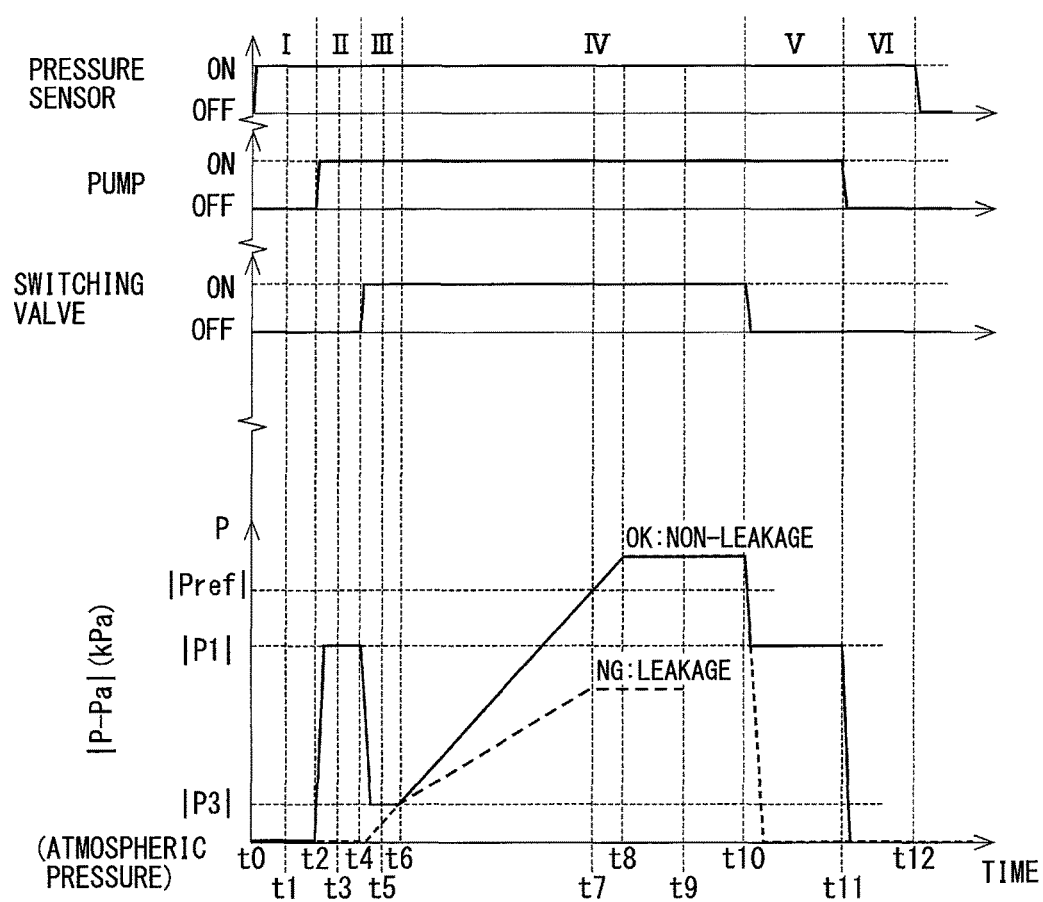
FIG. 14 is a time chart showing an example of the checking operation of the evaporation leakage executed by the evaporation leakage checking system, according to the sixth embodiment.

As a bold dashed-dotted line shown in FIG. 14, since the pressure in the fuel tank 2 is gradually decreased after the time point t4, the absolute value of the differential pressure between the pressure in the fuel tank 2 and the atmospheric pressure Pa is gradually increased after the time point t4.

As a bold solid line shown in FIG. 14, when the air in the fuel tank 2 becomes void at a time point t6, the absolute value of the differential pressure between the pressure in the pump passage unit 41 that is the pressure sensed by the pressure sensor 25 and the atmospheric pressure Pa, and the absolute value of the differential pressure between the pressure in the fuel tank 2 and the atmospheric pressure Pa are equal to the absolute value of the second pressure P3.

After the time point t6, the absolute value of the differential pressure between the pressure sensed by the pressure sensor 25 and the atmospheric pressure Pa, and the absolute value of the differential pressure between the pressure in the fuel tank 2 and the atmospheric pressure Pa are gradually increased.

As the above description, the ECU 20 stores the differential pressure between the pressure sensed by the pressure sensor 25 and the atmospheric pressure Pa as the second pressure P3 at the time point t5 before the air in the fuel tank 2 becomes void at the time point t6.

When the evaporation leakage does not occur at the fuel tank 2, the absolute value of the differential pressure between the pressure sensed by the pressure sensor 25 and the atmospheric pressure Pa becomes constant at a time point t8.

When the evaporation leakage occurs at the fuel tank 2, the absolute value of the differential pressure between the pressure sensed by the pressure sensor 25 and the atmospheric pressure Pa becomes constant at a time point t7, as a bold dashed line shown in FIG. 14.

At S311, the ECU 20 determines whether the absolute value of the checking pressure Pc is greater than or equal to the absolute value of the leakage threshold Pref at a time point t9. When the evaporation leakage does not occur at the fuel tank 2, the absolute value of the checking pressure Pc is greater than or equal to the absolute value of the leakage threshold Pref. In this case, the ECU 20 proceeds to S312. At S312, the ECU 20 determines that the evaporation leakage does not occur at the fuel tank 2. When the evaporation leakage occurs at the fuel tank 2, the absolute value of the checking pressure Pc is less than the absolute value of the leakage threshold Pref. In this case, the ECU 20 proceeds to S331. At S331, the ECU 20 determines that the evaporation leakage occurs at the fuel tank 2.

At S313, the ECU 20 turns off the switching valve 63 to use the atmosphere passage 445 to communicate with the first dividing passage 441 and the second passage 432, at a time point t10. Thus, the absolute value of the differential pressure between the pressure sensed by the pressure sensor 25 and the atmospheric pressure Pa is decreased to the absolute value of the first pressure P1. Further, the absolute value of the differential pressure between the pressure in the fuel tank 2 and the atmospheric pressure Pa is decreased to zero.

At S314, the ECU 20 stops the energization of the motor 15 of the pump 30 to stop the operation of the pump 30, at a time point t11. Thus, the absolute value of the differential pressure between the pressure sensed by the pressure sensor 25 and the atmospheric pressure Pa is decreased to zero.

At S315, the ECU 20 turns off the pressure sensor 25 to stop the sensing of the pressure by using the pressure sensor 25, at a time point t12.

According to the present embodiment, the atmosphere valve unit 60 includes the switching valve 63 that can switch between the first state and the second state. In other words, according to the present embodiment, the first closing valve 51 and the second closing valve 52 mentioned in the first embodiment are not provided, and the atmosphere closing valve 61 mentioned in the first embodiment is replaced by the switching valve 63. Thus, a total number of driving valves can be decreased. Further, a size of the checking module 11 can be miniaturized, and a total number of terminals of connecters and a total number of channels of the ECU 20 can be reduced.

According to the present embodiment, the switching valve 63 includes at least a part of the specified passage unit 43, and the second orifice member 72 that is arranged in the part of the specified passage unit 43. In this case, the part of the specified passage unit 43 is the specified passage 435. Thus, a length of the second passage 432 of the specified passage unit 43 can be shortened. Further, the size of the checking module 11 can be miniaturized.

Seventh Embodiment

Figure 15:
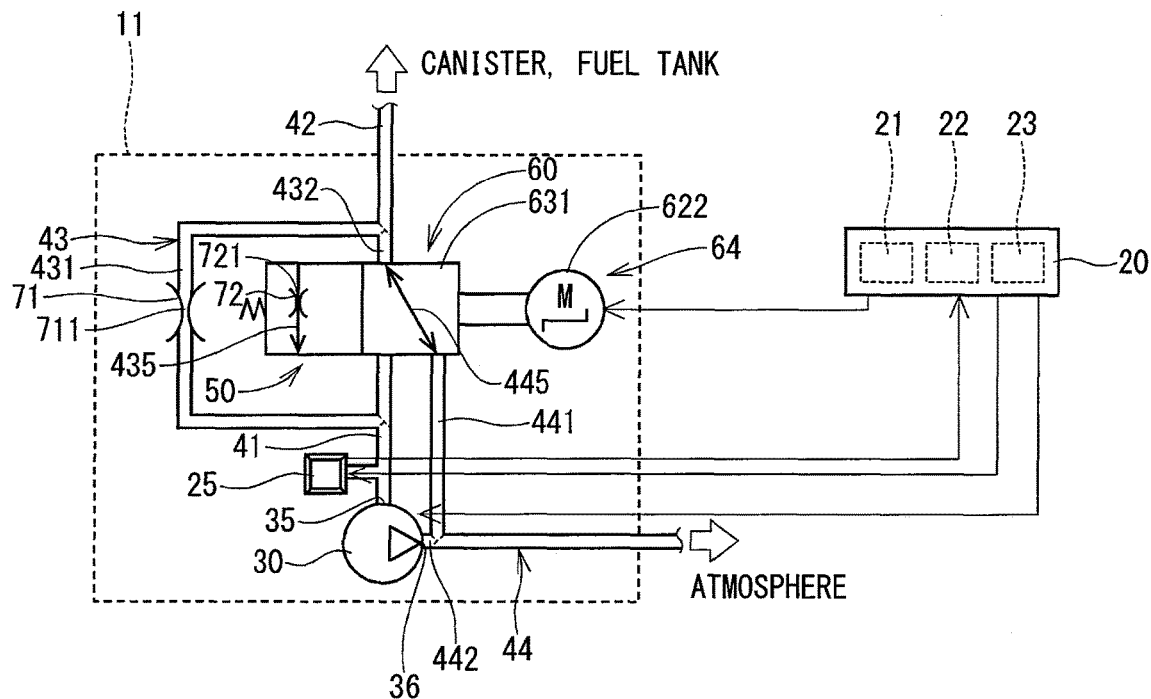
FIG. 15 is a schematic diagram showing the evaporation leakage checking system, according to a seventh embodiment of the present disclosure.

The evaporation leakage checking system according to a seventh embodiment of the present disclosure is shown in FIG. 15. According to the seventh embodiment, a configuration of the atmosphere valve unit 60 is different from that in the sixth embodiment.

According to the seventh embodiment, the atmosphere valve unit 60 includes a switching valve 64.

The switching valve 64 includes the valve portion 631 and the driving portion 622. The valve portion 631 is the same as that in the sixth embodiment. The driving portion 622 is the same as that in the third embodiment.

When the driving portion 622 is deenergized, the valve portion 631 is placed at a position where the atmosphere passage 445 communicates with the first dividing passage 441 and the second end of the second passage 432 and to communicate with the tank passage unit 42 and the communication between the first end and the second end of the second passage 432 is interrupted. In this case, the flow-passage area of the specified passage unit 43 becomes the first area A1.

When the driving portion 622 is energized, the valve portion 631 is placed at a position where the specified passage 435 communicates with the first end and the second end of the second passage 432 and the communication between the first dividing passage 441 and the second end of the second passage 432 is interrupted. In this case, the flow-passage area of the specified passage unit 43 becomes the second area A3 that is a sum of the area A1 and the area A2.

As the above description, the switching valve 64 can switch between the first state and the second state.

Eighth Embodiment

Figure 16A:
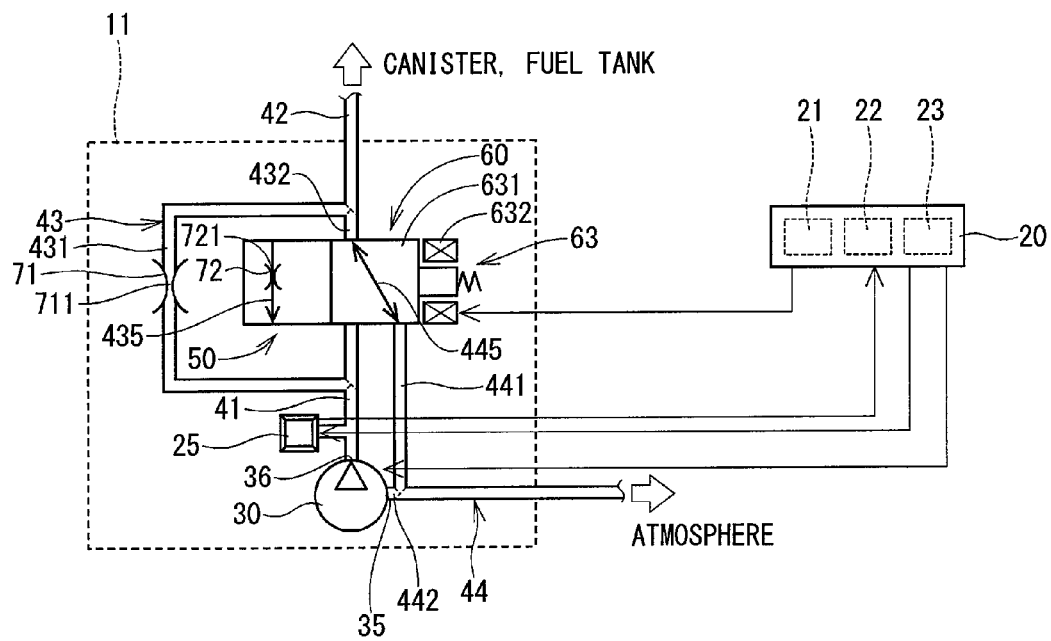
FIG. 16A is a schematic diagram showing the evaporation leakage checking system in a case where the atmosphere valve portion is turned off, according to an eighth embodiment of the present disclosure.
Figure 16B:
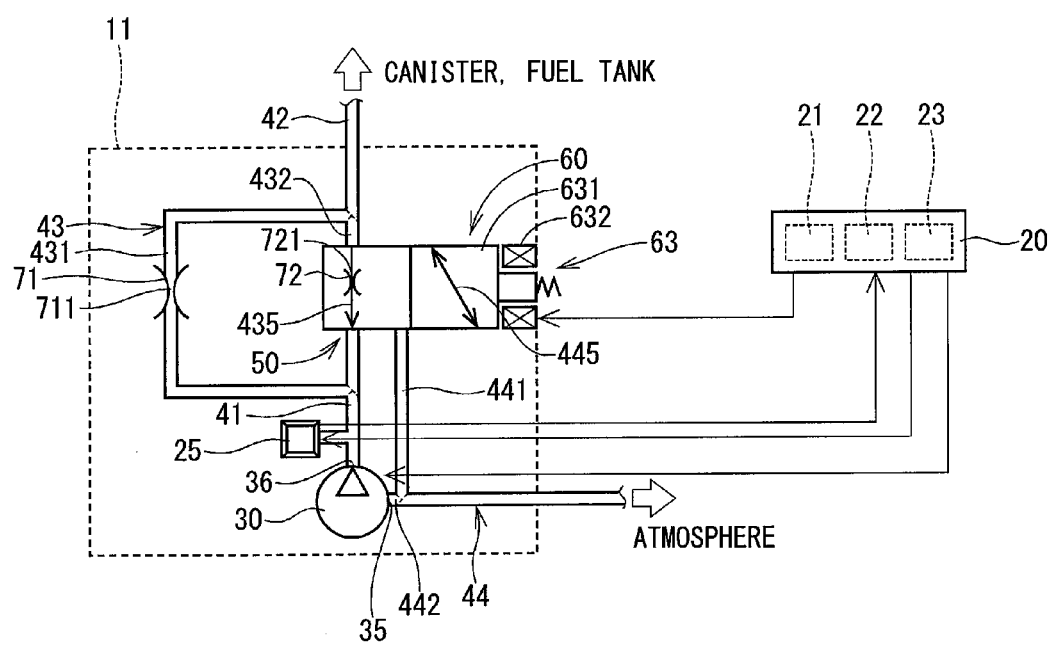
FIG. 16B is a schematic diagram showing the evaporation leakage checking system in a case where the atmosphere valve portion is turned on, according to the eighth embodiment.

The evaporation leakage checking system according to an eighth embodiment of the present disclosure is shown in FIG. 16. According to the eighth embodiment, an arrangement of the pump 30 is different from that in the sixth embodiment.

According to the eighth embodiment, the pump 30 is connected with the second dividing passage 442 of the atmosphere passage unit 44, and the outlet 36 is connected with the first end of the pump passage unit 41. In this case, the pump passage unit 41 is interposed between the specified passage unit 43 and the outlet 36. Thus, the pump 30 can compress the pump passage unit 41, the specified passage unit 43, the tank passage unit 42, and the fuel tank 2.

According to the eighth embodiment, the evaporation leakage checking system has the same configuration as that in the sixth embodiment except the above matters.

According to the present embodiment, the first end of the pump passage unit 41 is connected with the outlet 36 of the pump 30.

According to the present embodiment, since S300 indicated in the sixth embodiment is executed, the existence of the evaporation leakage can be checked as the same as the sixth embodiment.

Ninth Embodiment

Figure 17:
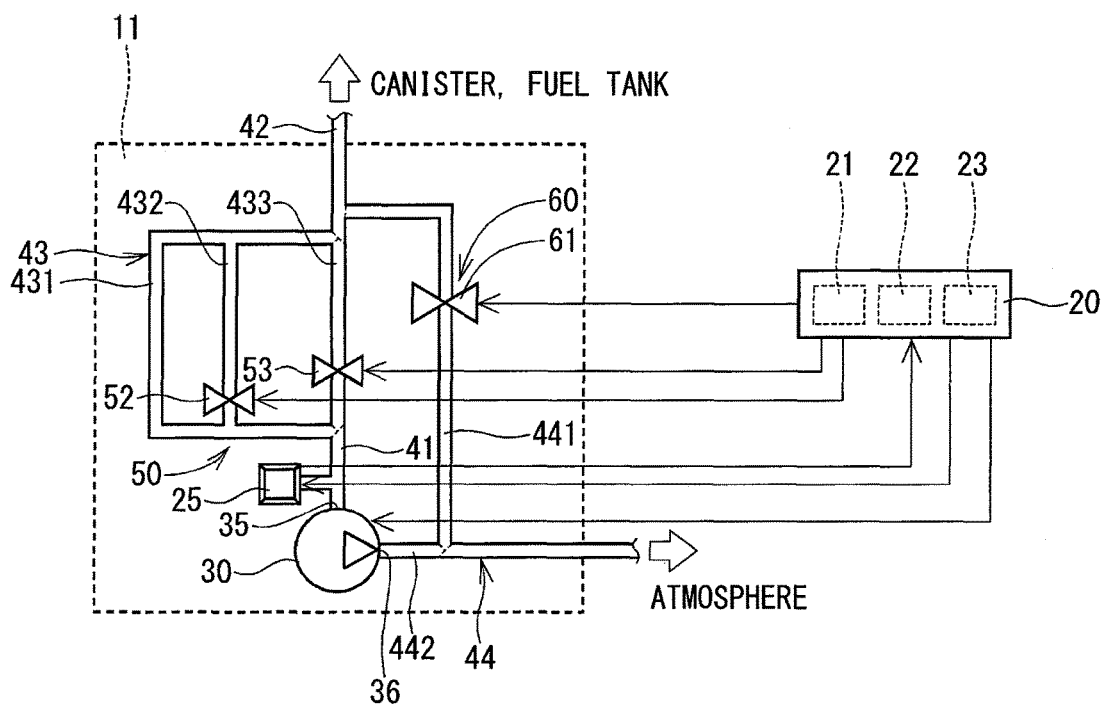
FIG. 17 is a schematic diagram showing the evaporation leakage checking system, according to a ninth embodiment of the present disclosure.

The evaporation leakage checking system according to a ninth embodiment of the present disclosure is shown in FIG. 17. According to the ninth embodiment, the evaporation leakage checking system has a configuration different from that in the first embodiment.

According to the ninth embodiment, the specified passage unit 43 includes the first passage 431, the second passage 432, and a third passage 433. The first passage 431, the second passage 432, and the third passage 433 have first ends that are connected with the second end of the pump passage unit 41, and have second ends that are connected with the second end of the tank passage unit 42. In this case, the fuel tank 2 is interposed between the first passage 431, the second passage 432, the third passage 433, and the fuel tank 2.

The first dividing passage 441 of the atmosphere passage unit 44 is connected with the second end of the tank passage unit 42. In this case, the specified passage unit 43 is interposed between the tank passage unit 42 and the first dividing passage 441 of the atmosphere passage unit 44.

The flow-passage area changing unit 50 includes the second closing valve 52 and a third closing valve 53.

The second closing valve 52 is arranged in the second passage 432, and opens or closes the second passage 432. The second closing valve 52 normally closes the second passage 432. In other words, when the second closing valve 52 is deenergized, the second closing valve 52 closes the second passage 432. When the second closing valve 52 is energized, the second closing valve 52 opens the second passage 432.

The third closing valve 53 is arranged in the third passage 433, and opens or closes the third passage 433. The third closing valve 53 normally closes the third passage 433. In other words, when the third closing valve 53 is deenergized, the third closing valve 53 closes the third passage 433. When the third closing valve 53 is energized, the third closing valve 53 opens the third passage 433. The third closing valve 53 is a normally-closing valve.

According to the present embodiment, flow-passage areas of the first passage 431, the second passage 432, and the third passage 433 are set to the areas A1, A2, and A3, respectively.

When the second closing valve 52 closes the second passage 432 and when the third closing valve 53 closes the third passage 433, the flow-passage area of the specified passage unit 43 becomes the area A1.

When the second closing valve 52 opens the second passage 432 and the third closing valve 53 closes the third passage 433, the flow-passage area of the specified passage unit 43 becomes an area A4 that is a sum of the area A1 and the area A2.

When the second closing valve 52 closes the second passage 432 and when the third closing valve 53 opens the third passage 433, the flow-passage area of the specified passage unit 43 becomes an area A5 that is a sum of the area A1 and the area A3.

When the second closing valve 52 opens the second passage 432 and when the third closing valve 53 opens the third passage 433, the flow-passage area of the specified passage unit 43 becomes an area A6 that is a sum of the area A1, the area A2, and the area A3.

As the above description, according to the present embodiment, the flow-passage area changing unit 50 can change the flow-passage area of the specified passage unit 43 to four areas that are the area A1, the area A4, the area A5, and the area A6, according to valve opening-closing states of the second closing valve 52 and the third closing valve 53.

According to the present embodiment, the calculating unit 21 calculates the leakage threshold Pref that is the threshold used to check the existence of the evaporation leakage, based on the first pressure P1 that is relative to the pressure sensed by the pressure sensor 25 in a case where the pump 30 is activated and the flow-passage area changing unit 50 changes the flow-passage area of the specified passage unit 43 to the area A1, a first area that is the area A1, a second pressure P4 that is relative to the pressure sensed by the pressure sensor 25 in a case where the pump 30 is activated and the flow-passage area changing unit 50 changes the flow-passage area of the specified passage unit 43 to the area A4, a second area that is the area A4, a third pressure P5 that is relative to the pressure sensed by the pressure sensor 25 in a case where the pump 30 is activated and the flow-passage area changing unit 50 changes the flow-passage area of the specified passage unit 43 to the area A5, a third area that is the area A5, a fourth pressure P6 that is relative to the pressure sensed by the pressure sensor 25 in a case where the pump 30 is activated and the flow-passage area changing unit 50 changes the flow-passage area of the specified passage unit 43 to the area A6, a fourth area that is the area A6, and the reference area Aref that is a predetermined area.

Specifically, the calculating unit 21 estimates two to six upper limits PQmax, based on two PQ characteristics that area selected from four PQ characteristics A1maxPQ, A4maxPQ, A5maxPQ, and A6maxPQ when the flow-passage area becomes maximum. The calculating unit 21 calculates two to six leakage thresholds Pref from the upper limits PQmax and the reference PQ characteristic ArefPQ. The calculating unit 21 averages the leakage thresholds Pref to obtain a final leakage threshold Pref.

As the above description, according to the present embodiment, the flow-passage area changing unit 50 can change the flow-passage area of the specified passage unit 43 to four areas including the first area A1, the second area A4, the third area A5, and the fourth area A6. The calculating unit 21 calculates the leakage threshold Pref, based on the first to fourth pressures and the first to fourth areas. Thus, according to the present embodiment, the leakage threshold Pref can be more accurately calculated than that calculated in the above embodiments where the first and second pressures and the first and second areas are used to calculate the leakage threshold Pref. Thus, the evaporation leakage checking system can be flexibly applied to the standard of the emission regulation of the evaporation, and the existence of the evaporation leakage can be accurately determined.

Tenth Embodiment

Figure 18:
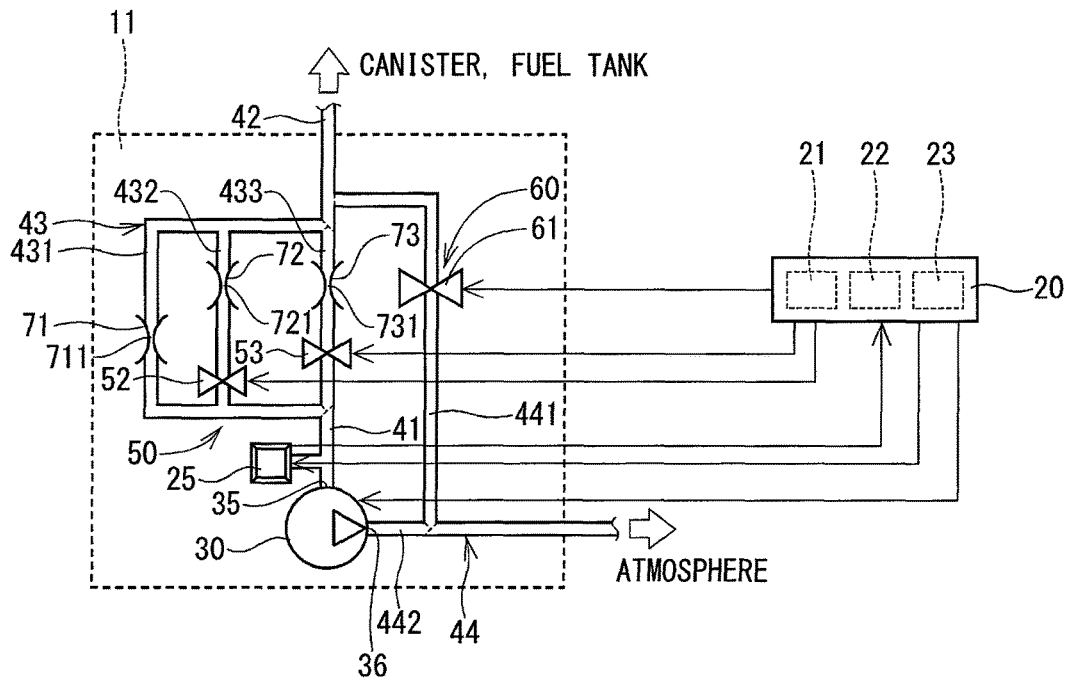
FIG. 18 is a schematic diagram showing the evaporation leakage checking system, according to a tenth embodiment of the present disclosure.

The evaporation leakage checking system according to a tenth embodiment of the present disclosure is shown in FIG. 18. According to the tenth embodiment, a total number of members is different from that in the ninth embodiment.

According to the tenth embodiment, the checking module 11 includes the first orifice member 71, the second orifice member 72, and a third orifice member 73.

The first orifice member 71, the second orifice member 72, and the third orifice member 73 are made of a metal such as a stainless.

The first orifice member 71 is arranged in the first passage 431. The first orifice member 71 includes the first opening 711 that is an opening having the area A1 that is predetermined. Thus, the flow-passage area of the first passage 431 of the specified passage unit 43 is equivalent to the area A1 of the first opening 711.

The second orifice member 72 is arranged in the second passage 432. The second orifice member 72 includes the second opening 721 that is an opening having the area A2 that is predetermined. Thus, the flow-passage area of the second passage 432 of the specified passage unit 43 is equivalent to the area A2 of the second opening 721.

The third orifice member 73 is arranged in the third passage 433. The third orifice member 73 includes a third opening 731 that is an opening having the area A3 that is predetermined. Thus, the flow-passage area of the third passage 433 of the specified passage unit 43 is equivalent to the area A3 of the third opening 731.

According to the tenth embodiment, the evaporation leakage checking system has the same configuration as that in the ninth embodiment except the above matters.

As the above description, according to the present embodiment, the first orifice member 71 including an opening having the area A1, the second orifice member 72 including an opening having the area A2, and the third orifice member 73 including an opening having the area A3, are arranged in the specified passage unit 43. The flow-passage areas of the first passage 431, the second passage 432, and the third passage 433, can be accurately set by the first orifice member 71, the second orifice member 72, and the third orifice member 73. Thus, the evaporation leakage checking system can be flexibly applied to the standard of the emission regulation of the evaporation, and the existence of the evaporation leakage can be further accurately determined.

Eleventh Embodiment

Figure 19:
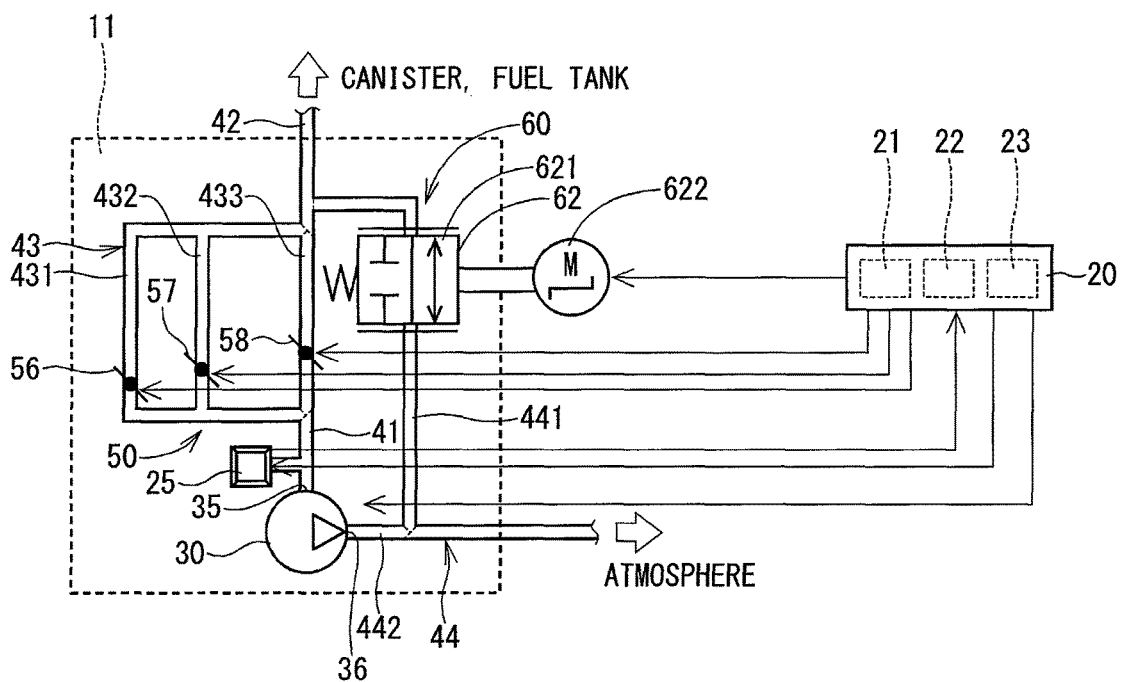
FIG. 19 is a schematic diagram showing the evaporation leakage checking system, according to an eleventh embodiment of the present disclosure.

The evaporation leakage checking system according to an eleventh embodiment of the present disclosure is shown in FIG. 19. According to the eleventh embodiment, the evaporation leakage checking system has a configuration different from that in the ninth embodiment.

According to the eleventh embodiment, the checking module 11 does not include the second closing valve 52, the third closing valve 53, and the atmosphere closing valve 61 that are mentioned in the ninth embodiment. According to the eleventh embodiment, the checking module 11 includes a first opening variable valve 56, a second opening variable valve 57, a third opening variable valve 58, and a fourth opening variable valve 62 that is the second opening variable valve 62 mentioned in the third embodiment.

The first opening variable valve 56, the second opening variable valve 57, and the third opening variable valve 58, are butterfly valves that have valve portions that are plate shape and rotate when the butterfly valves are energized, as the same as the first opening variable valve 55 mentioned in the third embodiment.

The first opening variable valve 56 is arranged in the first passage 431 of the specified passage unit 43. The flow-passage area changing unit 50 can change the flow-passage area of the first passage 431 to zero or the area A1, by changing an opening position of the first opening variable valve 56. When the flow-passage area changing unit 50 changes the flow-passage area of the first passage 431 to zero, the first passage 431 is closed.

The second opening variable valve 57 is arranged in the second passage 432 of the specified passage unit 43. The flow-passage area changing unit 50 can change the flow-passage area of the second passage 432 to zero or the area A2, by changing an opening position of the second opening variable valve 57. When the flow-passage area changing unit 50 changes the flow-passage area of the second passage 432 to zero, the second passage 432 is closed.

The third opening variable valve 58 is arranged in the third passage 433 of the specified passage unit 43. The flow-passage area changing unit 50 can change a flow-passage area of the third passage 433 to zero or the area A3, by changing an opening position of the third opening variable valve 58. When the flow-passage area changing unit 50 changes the flow-passage area of the third passage 433 to zero, the third passage 433 is closed.

When the opening position of the first opening variable valve 56 is a value corresponding to the area A1 and when the opening position of the second opening variable valve 57 is zero and when the opening position of the third opening variable valve 58 is zero, the flow-passage area of the specified passage unit 43 becomes the area A1.

When the opening position of the first opening variable valve 56 is a value corresponding to the area A1 and when the opening position of the second opening variable valve 57 is a value corresponding to the area A2 and when the opening position of the third opening variable valve 58 is zero, the flow-passage area of the specified passage unit 43 becomes the area A4 that is a sum of the area A1 and the area A2.

When the opening position of the first opening variable valve 56 is a value corresponding to the area A1 and when the opening position of the second opening variable valve 57 is zero and when the opening position of the third opening variable valve 58 is a value corresponding to the area A3, the flow-passage area of the specified passage unit 43 becomes the area A5 that is a sum of the area A1 and the area A3.

When the opening position of the first opening variable valve 56 is a value corresponding to the area A1 and when the opening position of the second opening variable valve 57 is a value corresponding to the area A2 and when the opening position of the third opening variable valve 58 is a value corresponding to the area A3, the flow-passage area of the specified passage unit 43 becomes the area A6 that is a sum of the area A1, the area A2, and the area A3.

According to the present embodiment, the flow-passage area changing unit 50 can change the flow-passage area of the specified passage unit 43 to at least four areas including the area A1, the area A4, the area A5, and the area A6, according to valve opening-closing states of the first opening variable valve 56, the second opening variable valve 57, and the third opening variable valve 58.

According to the present embodiment, the calculating unit 21 calculates the leakage threshold Pref using a method same as that in the ninth embodiment.

As the above description, according to the present embodiment, the flow-passage area changing unit 50 can change the flow-passage area of the specified passage unit 43 to four areas including the first area A1, the second area A4, the third area A5, and the fourth area A6, as the same as that in the ninth embodiment. The calculating unit 21 calculates the leakage threshold Pref, based on the first to fourth pressure and the first to fourth area. Thus, the evaporation leakage checking system can be flexibly applied to the standard of the emission regulation of the evaporation, and the existence of the evaporation leakage can be accurately determined.

(Other embodiment) According to the first embodiment, a magnitude relationship between the area A1 of the first opening 711 of the first orifice member 71 and the area A2 of the second opening 721 of the second orifice member 72 is not limited. According to the present disclosure, the magnitude relationship between the area A1 and the area A2 may be limited. When the area A1 is less than the area A2, a difference between the area A1 and the area A3 that is a sum of the area A1 and the area A2 is larger than that in a case where the area A1 is greater than or equal to the area A2. In this case, the sensing accuracy can be improved.

According to the ninth embodiment, the tenth embodiment, and the eleventh embodiment, the flow-passage area changing unit 50 can change the flow-passage of the specified passage unit 43 to four areas including the first area A1, the second area A4, the third area A5, and the fourth area A6, and the calculating unit 21 calculates the leakage threshold Pref based on the first to fourth pressure and the first to fourth area. According to the present disclosure, the calculating unit 21 may calculate the leakage threshold Pref based on at least two groups from four groups including a first group having the first pressure and the first area, a second group having the second pressure and the second area, a third group having the third pressure and the third area, and a fourth group having the fourth pressure and the fourth area.

According to the third embodiment, the flow-passage area changing unit 50 can change the flow-passage area of the specified passage unit 43 to two areas including the first area A1 and the second area A2, by changing the opening position of the first opening variable valve 55. According to the present disclosure, the flow-passage area changing unit 50 may change the flow-passage area of the specified passage unit 43 to plural areas including the first area and an Nth area, by changing the opening position of the first opening variable valve 55. In this case, N is a value greater than two. The calculating unit 21 can calculate the leakage threshold Pref, based on at least two groups from plural groups including a first group having the first pressure and the first area, . . . , a (N−1)th group having a (N−1)th pressure and a (N−1)th area, and a Nth group having a Nth pressure and the Nth area. When a total number of the groups that is used in the calculation of the leakage threshold Pref becomes larger, a time interval of the calculation becomes larger, and a calculating accuracy that is an accuracy of calculating the leakage threshold Pref is improved.

According to the above embodiment, the reference area Aref is set to an area of an opening having a dimension of φ0.5 mm. According to the present disclosure, the reference area Aref may be set to a value that is applied to the standard of the emission regulation of the evaporation. According to the present disclosure, when the standard of the emission regulation of the evaporation is changed, the evaporation leakage checking system can be applied to the standard of the emission regulation of the evaporation only by changing a value of the reference area Aref, without changing a configuration of the evaporation leakage checking system.

According to the present disclosure, the reference area Aref may be set to a value without respect to the flow-passage area of the specified passage unit.

At S108 of the first embodiment, the maximum values of the first area and the second area obtained by considering the variations are maximum values estimated based on a dimension variation of the orifice member in manufacturing and a dimension variation of the orifice member generated due to a temperature variation and a humidity variation. According to the present disclosure, the maximum values of the first area and the second area obtained by considering the variations may be obtained by estimating based on at least one of the temperature or the pressure in the calculation at S108. According to the first embodiment, the maximum values of the flow-passage area, the first area, and the second area obtained by considering the variations can be estimated based on the pressure sensed by the pressure sensor 25. When the evaporation leakage checking system includes a temperature sensor, the maximum value of the flow-passage area obtained by considering the variations can be estimated based on a temperature sensed by the temperature sensor or based on the temperature and the pressure.

According to the above embodiments, the orifice member is made of a material different from that of which the specified passage unit is made. According to the present disclosure, the orifice member may be integrally provided with the specified passage unit using the same material. In other words, the orifice member may be seamlessly bonded to the specified passage unit.

According to the first to seventh embodiments and the ninth to eleventh embodiments, the first end of the pump passage unit is connected with the inlet of the pump. When the checking operation of the evaporation leakage is executed, the pump decreases the pressure in the pump passage unit. According to the present disclosure, when the checking operation of the evaporation leakage is executed, the pump may be reversely rotated to increase the pressure in the pump passage unit.

According to the present disclosure, the pump is not limited to a vane pump, and may be other pumps.

According to the above embodiments, any combinations of members may be applied to the present disclosure when a disturbance is not generated in the configuration of the evaporation leakage checking system.

According to the present disclosure, at least a part of functions executed by the control unit may be constituted by a hardware including one or more integrated circuits (IC). The functions executed by the control unit can be achieved by a software stored in a substantive memory and a computer executing the software, or can be achieved only by a software, or can be achieved only by a hardware, or can be achieved by a combination of the software, the computer, and the hardware. For example, when the control unit is constituted by en electric circuit that is a hardware, the control unit can include a digital circuit or an analog circuit that has plural logic circuits.

The present disclosure is not limited to the embodiments mentioned above, and can be applied to various embodiments within the spirit and scope of the present disclosure.

While the present disclosure has been described with reference to the embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An evaporation leakage checking system comprising:
a pump including an inlet and an outlet;
a pump passage unit having a first end that is connected with the inlet or the outlet, and a second end;
a tank passage unit having a first end that is connected with a fuel tank storing a fuel, and a second end;
a specified passage unit having a first end that is connected with the second end of the pump passage unit, and a second end that is connected with the second end of the tank passage unit;
an atmosphere passage unit having a first end that is connected with the second end of the tank passage unit or the second end of the specified passage unit, and a second end that is exposed to the atmosphere;
a flow-passage area changing unit changing a flow-passage area of the specified passage unit to a plurality of areas including a first area and an Nth area, N being a value greater than one;
an atmosphere valve unit changing a flow-passage area of the atmosphere passage unit;
a pressure sensing unit sensing a pressure in the pump passage unit; and
a control unit controlling operations of the pump, the flow-passage area changing unit, and the atmosphere valve unit, wherein
the control unit includes
a calculating unit that calculates a leakage threshold that is a threshold used to check an existence of an evaporation leakage that is a leakage of an evaporation that is an evaporated fuel, based on a first pressure that is relative to a pressure sensed by the pressure sensing unit in a case where the pump is activated and the flow-passage area changing unit changes the flow-passage area of the specified passage unit to the first area, the first area, an Nth pressure that is relative to the pressure sensed by the pressure sensing unit in a case where the pump is activated and the flow-passage area changing unit changes the flow-passage area of the specified passage unit to the Nth area, the Nth area, and a reference area that is predetermined, and
a leakage checking unit that activates the pump, closes the atmosphere passage unit by changing the flow-passage area of the atmosphere passage unit by using the atmosphere valve unit, and checks the existence of the evaporation leakage based on the leakage threshold and a checking pressure that is the pressure sensed by the pressure sensing unit in a case where a communication between the tank passage unit and the pump passage unit is allowed.

2. The evaporation leakage checking system according to claim 1, wherein
the leakage checking unit determines that the evaporation leakage occurs, in a case where an absolute value of the checking pressure is less than an absolute value of the leakage threshold.

3. The evaporation leakage checking system according to claim 1, wherein
the calculating unit calculates the leakage threshold, based on dimension variations of the first area and the Nth area in manufacturing, a dimension variation generated due to a temperature variation and a humidity variation, and sensing errors of the first pressure and the Nth pressure.

4. The evaporation leakage checking system according to claim 1, further comprising:
an orifice member arranged in the specified passage unit and including an opening, wherein
the orifice member has at least one of characteristics that the linear expansion coefficients are less than that of a member constituting the specified passage unit, the variations of dimension generated due to the water absorbing are less than that of the member constituting the specified passage unit, the variations of dimension generated due to the fuel that is exposed are less than that of the member constituting the specified passage unit, and the variations of opening areas generated due to the magnesium chloride solution, the calcium chloride solution, or the natrium chloride solution that is exposed are less than that of the member constituting the specified passage unit.

5. The evaporation leakage checking system according to claim 1, wherein
the atmosphere valve unit includes a switching valve that switches between a first state and a second state,
the first state is a state where a communication between the tank passage unit and the atmosphere passage unit is allowed, and the communication between the tank passage unit and the pump passage unit is interrupted, and
the second state is a state where the communication between the tank passage unit and the atmosphere passage unit is interrupted, and the communication between the tank passage unit and the pump passage unit is allowed.

6. The evaporation leakage checking system according to claim 5, wherein
the switching valve includes at least a part of the specified passage unit, and the orifice member that is arranged in the part of the specified passage unit.

7. The evaporation leakage checking system according to claim 1, wherein
the flow-passage area changing unit includes an opening variable valve that changes an opening position of the opening variable valve to change the flow-passage area of the specified passage unit, and
the flow-passage area changing unit changes the flow-passage area of the specified passage unit to a plurality of areas including the first area and the Nth area, by changing the opening position of the opening variable valve.

8. The evaporation leakage checking system according to claim 1, wherein
the flow-passage area changing unit changes a flow-passage area of the atmosphere passage unit, by changing an opening position of the atmosphere valve unit, and
the flow-passage area changing unit changes a substantial flow-passage area of the specified passage unit to a plurality of areas including the first area and the Nth area, by changing the opening position of the atmosphere valve unit.

9. The evaporation leakage checking system according to claim 1, wherein
the control unit further includes a malfunction determining unit that determines that a malfunction occurs in the evaporation leakage checking system in a case where the first pressure or the second pressure becomes out of a range that is obtained based on a variation of a characteristic of the pump and is also obtained based on the first area and the Nth area.

10. The evaporation leakage checking system according to claim 9, wherein
the leakage checking unit interrupts the checking operation of the evaporation leakage in a case where the malfunction determining unit determines that the malfunction occurs in the evaporation leakage checking system.

11. The evaporation leakage checking system according to claim 10, wherein
the calculating unit interrupts a calculation of the leakage threshold in a case where the malfunction determining unit determines that the malfunction occurs in the evaporation leakage checking system.

12. The evaporation leakage checking system according to claim 1, wherein
the first end of the pump passage unit is connected with the inlet of the pump, and
the pump decreases the pressure in the pump passage unit.

13. The evaporation leakage checking system according to claim 1, wherein
the pump is a vane pump that includes a casing,
a rotor rotatably arranged in the casing and on an outer wall of which a groove portion is arranged, and
a vane being a plate and reciprocating in the groove portion in a radial direction of the rotor.

14. A checking method of an evaporation leakage for an evaporation leakage checking system including a pump including an inlet and an outlet; a pump passage unit having a first end that is connected with the inlet or the outlet, and a second end; a tank passage unit having a first end that is connected with a fuel tank storing a fuel, and a second end; a specified passage unit having a first end that is connected with the second end of the pump passage unit, and a second end that is connected with the second end of the tank passage unit; an atmosphere passage unit having a first end that is connected with the second end of the tank passage unit or the second end of the specified passage unit, and a second end that is exposed to the atmosphere; a flow-passage area changing unit changing a flow-passage area of the specified passage unit to a plurality of areas including a first area and an Nth area, N being a value greater than one; an atmosphere valve unit changing a flow-passage area of the atmosphere passage unit; a pressure sensing unit sensing a pressure in the pump passage unit; and a control unit controlling operations of the pump, the flow-passage area changing unit, and the atmosphere valve unit, the checking method comprising:
starting a sensing of the pressure by using the pressure sensing unit;
starting an operation of the pump;
storing a pressure relative to the pressure sensed by the pressure sensing unit in a case where the flow-passage area of the specified passage unit is the first area as a first pressure;
changing the flow-passage area of the specified passage unit to the Nth area by using the flow-passage area changing unit;
storing a pressure relative to the pressure sensed by the pressure sensing unit in a case where the flow-passage area of the specified passage unit is the second area as an Nth pressure;
calculating a leakage threshold that is a threshold used to check an existence of an evaporation leakage that is a leakage of an evaporation that is an evaporated fuel, based on the first pressure, the first area, the Nth pressure, the Nth area, and a reference area that is predetermined;
closing the atmosphere passage unit by changing the flow-passage area of the atmosphere passage unit by using the atmosphere valve unit;
checking the existence of the evaporation leakage, based on the leakage threshold and a checking pressure that is the pressure sensed by the pressure sensing unit in a case where a communication between the tank passage unit and the pump passage unit is allowed.

15. The checking method of the evaporation leakage according to claim 14, wherein
in the checking, determining that the evaporation leakage occurs in a case where an absolute value of the checking pressure is less than an absolute value of the leakage threshold.

* * * * *